United States Patent
Saxe et al.

(10) Patent No.: US 11,003,774 B2
(45) Date of Patent: May 11, 2021

(54) METHODS AND APPARATUS FOR DETECTION OF MALICIOUS DOCUMENTS USING MACHINE LEARNING

(71) Applicant: Sophos Limited, Abingdon (GB)

(72) Inventors: Joshua Daniel Saxe, Los Angeles, CA (US); Ethan M. Rudd, Colorado Springs, CO (US); Richard Harang, Alexandria, VA (US)

(73) Assignee: Sophos Limited, Abingdon (GB)

( * ) Notice: Subject to any disclaimer, the term of this patent is extended or adjusted under 35 U.S.C. 154(b) by 35 days.

(21) Appl. No.: 16/257,749

(22) Filed: Jan. 25, 2019

(65) Prior Publication Data

US 2019/0236273 A1    Aug. 1, 2019

Related U.S. Application Data

(60) Provisional application No. 62/622,440, filed on Jan. 26, 2018.

(51) Int. Cl.
    *G06F 21/00*    (2013.01)
    *G06F 21/56*    (2013.01)
    (Continued)

(52) U.S. Cl.
    CPC ............ *G06F 21/563* (2013.01); *G06F 21/56* (2013.01); *G06F 21/562* (2013.01);
    (Continued)

(58) Field of Classification Search
    CPC ...... G06F 21/565; G06F 21/563; G06F 21/56; G06F 21/562; H04L 63/14; H04L 63/02
    (Continued)

(56) References Cited

U.S. PATENT DOCUMENTS 7,069,589 B2   6/2006   Schmall et al.
7,204,152 B2   4/2007   Woodward et al.
(Continued)

FOREIGN PATENT DOCUMENTS

CA          2799691 C        9/2014
WO    WO 2007/117636 A2    10/2007
(Continued)

OTHER PUBLICATIONS

Ba, et al., "Layer Normalization." [Online] Retrieved from the Internet https://arxiv.org/pdf/1607.06450.pdf>, Submitted on Jul. 21, 2016, 14 pages.

(Continued)

*Primary Examiner* — Longbit Chai
(74) *Attorney, Agent, or Firm* — Cooley LLP

(57) ABSTRACT

An apparatus for detecting malicious files includes a memory and a processor communicatively coupled to the memory. The processor receives multiple potentially malicious files. A first potentially malicious file has a first file format, and a second potentially malicious file has a second file format different than the first file format. The processor extracts a first set of strings from the first potentially malicious file, and extracts a second set of strings from the second potentially malicious file. First and second feature vectors are defined based on lengths of each string from the associated set of strings. The processor provides the first feature vector as an input to a machine learning model to produce a maliciousness classification of the first potentially malicious file, and provides the second feature vector as an input to the machine learning model to produce a maliciousness classification of the second potentially malicious file.

24 Claims, 13 Drawing Sheets

(51) Int. Cl.
G06N 3/04 (2006.01)
G06N 5/00 (2006.01)
G06N 20/20 (2019.01)
G06K 9/62 (2006.01)

(52) U.S. Cl.
CPC ......... G06K 9/6256 (2013.01); G06K 9/6267 (2013.01); G06N 3/04 (2013.01); G06N 3/0454 (2013.01); G06N 5/003 (2013.01); G06N 20/20 (2019.01)

(58) Field of Classification Search
USPC .......................................................... 726/24
See application file for complete search history.

(56) References Cited

U.S. PATENT DOCUMENTS

| | | | |
|---|---|---|---|
| 7,219,148 | B2 | 5/2007 | Rounthwaite et al. |
| 7,545,986 | B2 | 6/2009 | Bachmann |
| 7,558,832 | B2 | 7/2009 | Rounthwaite et al. |
| 7,711,663 | B2 | 5/2010 | Weng |
| 7,769,772 | B2 * | 8/2010 | Weyl .................. G06K 9/00463 707/765 |
| 7,934,103 | B2 | 4/2011 | Kidron |
| 8,458,794 | B1 | 6/2013 | Sallam |
| 9,189,730 | B1 | 11/2015 | Coenen et al. |
| 9,404,833 | B2 | 8/2016 | Stadlbauer et al. |
| 9,514,391 | B2 | 12/2016 | Perronnin et al. |
| 9,531,742 | B2 * | 12/2016 | Kohout ............... H04L 63/1425 |
| 9,672,358 | B1 | 6/2017 | Long et al. |
| 9,690,938 | B1 | 6/2017 | Saxe et al. |
| 9,721,097 | B1 | 8/2017 | Davis et al. |
| 9,792,492 | B2 | 10/2017 | Soldevila et al. |
| 9,807,113 | B2 | 10/2017 | Yang et al. |
| 9,864,956 | B1 | 1/2018 | Sai |
| 10,015,150 | B2 * | 7/2018 | Basin .................... H04L 9/3239 |
| 10,193,902 | B1 * | 1/2019 | Caspi .................. H04L 63/1416 |
| 10,635,813 | B2 | 4/2020 | Saxe et al. |
| 2009/0300765 | A1 | 12/2009 | Moskovitch et al. |
| 2014/0090061 | A1 * | 3/2014 | Avasarala ............... G06F 21/56 726/24 |
| 2014/0143869 | A1 | 5/2014 | Pereira et al. |
| 2015/0067853 | A1 | 3/2015 | Amrutkar et al. |
| 2015/0363294 | A1 | 12/2015 | Carback, III et al. |
| 2017/0078317 | A1 | 3/2017 | Gertner et al. |
| 2017/0212829 | A1 | 7/2017 | Bales et al. |
| 2017/0372071 | A1 | 12/2017 | Saxe et al. |
| 2018/0101682 | A1 * | 4/2018 | Krukov ................ G06F 21/565 |
| 2018/0211041 | A1 | 7/2018 | Davis |
| 2018/0293381 | A1 | 10/2018 | Tseng et al. |
| 2019/0108338 | A1 | 4/2019 | Saxe et al. |
| 2019/0236490 | A1 | 8/2019 | Harang et al. |
| 2019/0266492 | A1 | 8/2019 | Harang et al. |
| 2020/0117975 | A1 | 4/2020 | Harang et al. |
| 2020/0250309 | A1 | 8/2020 | Harang et al. |
| 2020/0257799 | A1 | 8/2020 | Saxe et al. |

FOREIGN PATENT DOCUMENTS

| | | |
|---|---|---|
| WO | WO 2019/150079 A1 | 8/2019 |
| WO | WO 2019/166989 A1 | 9/2019 |

OTHER PUBLICATIONS

Harang, R. "Estimating weight sharing in multi-task networks via approximate Fisher information," SOPHOS, [online] Retrieved from the Internet https://www.camlis.org/s/harang_CAMLIS17.pdf> Oct. 28, 2017, 31 pages.

Huang, L. et al., "Orthogonal Weight Normalization: Solution to Optimization over Multiple Dependent Stiefel Manifolds in Deep Neural Networks," [Online], Retrieved from the Internet: <URL: https://arxiv.org/pdf/1709.06079.pdf>, Nov. 21, 2017, 20 pages.

International Search Report and Written Opinion for International Patent Application No. PCT/US2018/054558, dated Dec. 10, 2018, 6 pages.

Ioffe and Szegedy, "Batch Normalization: Accelerating Deep Network Training by Reducing Internal Covariate Shift." [Online] Retrieved from the Internet https://arxiv.org/pdf/1502.03167v3.pdf>, Submitted on Feb. 11, 2015 (v1), last revised Mar. 2, 2015 (this version, v3), 11 pages.

Kirkpatrick, J. et al., "Overcoming catastrophic forgetting in neural networks," PNAS (2017); 114 (13): 3521-3526.

Liao and Carneiro, "On the Importance of Normalisation Layers in Deep Learning with Piecewise Linear Activation Units." [Online] Retrieved from the Internet https://arxiv.org/pdf/1508.00330.pdf>, Submitted on Aug. 3, 2015 (v1), last revised Nov. 1, 2015 (this version, v2)), 7 pages.

Liao, et al., "Streaming Normalization: Towards Simpler and More Biologically-plausible Normalizations for Online and Recurrent Learning." Center for Brains, Minds & Machines, Memo No. 057, [Online] Retrieved from the Internet https://arxiv.org/pdf/1610.06160.pdf>, Oct. 19, 2016, 21 pages.

Lundberg, S. M. et al., "A Unified Approach to Interpreting Model Predictions," 31st Conference on Neural Information Processing Systems (NIPS 2017), Long Beach, CA, USA, 10 pages.

Montavon, G. et al., "Methods for Interpreting and Understanding Deep Neural Networks," [Online], Retrieved from the Internet: <URL: https://arxiv.org/pdf/1706.07979.pdf>, Jun. 24, 2017, 14 pages.

Pascanu, R. et al., "Revisiting natural gradient for deep networks," [Online], Retrieved from the Internet: <URL: https:/arxiv.org/pdf/1301.3584v7.pdf>, Feb. 17, 2014, 18 pages.

Ribeiro, M. T. et al., "Model-Agnostic Interpretability of Machine Learning," [Online], Retrieved from the Internet: <URL: https://arxiv.org/pdf/1606.05386.pdf>, Jun. 16, 2016, 5 pages.

Ribeiro, M. T. et al., "'Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.

Ribeiro, M. T., "LIME—Local Interpretable Model-Agnostic Explanations," [Online Blog], Retrieved from the Internet: <URL: https://homes.cs.washington.edu/~marcotcr/blog/lime/>, Apr. 2, 2016, 7 pages.

Rudd, E.R., et al., "MOON: A Mixed Objective Optimization Network for the Recognition of Facial Attributes." [Online], Retrieved from the Internet: <URL:https://arxiv.org/abs/1603.07027>, arXiv:1603.07027 [cs.CV] , Mar. 22, 2016, 17 pages.

Salimans, T. et al., "Weight Normalization: A Simple Reparameterization to Accelerate Training of Deep Neural Networks," [Online], Retrieved from the Internet: <URL: https://arxiv.org/pdf/1602.07868.pdf>, Jun. 4, 2016, 11 pages.

Santos and Torres, "Macro Malware Detection using Machine Learning Techniques—A New Approach." In Proceedings of the 3rd International Conference on Information Systems Security and Privacy (ICISSP 2017, SCITEPRESS—Science and Technology Publications, Lda), pp. 295-302, ISBN: 978-989-758-209-7, ElevenPaths, Telefónica Digital Cyber Security Unit, Madrid, Spain. [Online], Retrieved from the Internet on Nov. 19, 2018: http://www.scitepress.org/Papers/2017/61322, 8 pages.

Saxe and Berlin, "Deep Neural Network Based Malware Detection Using Two Dimensional Binary Program Features," IEEE 2015,10th International Conference on Malicious and Unwanted Software: "Know Your Enemy" (MALWARE), 2015, pp. 11-20.

Saxe and Berlin, "eXpose: A Character-Level Convolutional Neural Network with Embeddings for Detecting Malicious URLs, File Paths and Registry Keys." [Online], Retrieved from the Internet: <https://arxiv.org/abs/1702.08568>, arXiv:1702.08568v1 [cs.CR], Feb. 27, 2017, 18 pages.

Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.

(56) References Cited

OTHER PUBLICATIONS

Tahan, G., et al., "Mal:ID: Automatic Malware Detection Using Common Segment Analysis and Meta-Features." Journal of Machine Learning (2012); (Submitted Aug. 2011; Published Feb. 2012); 1: 1-48, 33 pages.

Theis, L. et al., "Faster gaze prediction with dense networks and Fisher pruning," [Online], Retrieved from the Internet: <URL: https://arxiv.org/pdf/1801.05787.pdf>, Jan. 17, 2018, 10 pages.

Tolomei, G. et al., "Interpretable Predictions of Tree-based Ensembles via Actionable Feature Tweaking," [Online], Retrieved from the Internet: <URL: https://arxiv.org/pdf/1706.06691.pdf>, Jun. 20, 2017, 10 pages.

Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).

Wu, et al., "L1-Norm Batch Normalization for Efficient Training of Deep Neural Networks." [Online] Retrieved from the Internet https://arxiv.org/pdf/1802.09769.pdf>, Submitted on Feb. 27, 2018, 8 pages.

Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&_acm_=1573741004_98b035a9ad71ffc3e5289851a65d39e7, 12 pages.

Harang and Ducau, "Measuring the speed of the Red Queen's Race", BlackHat USA 2018, Aug. 4-9, 2018, Las Vegas, NV, USA, 18 pages.

Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.

Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.

International Preliminary Report on Patentability for International Patent Application No. PCT/US2018/054558, dated Apr. 8, 2020, 5 pages.

International Search Report and Written Opinion for International Patent Application No. PCT/GB2019/050199, dated Mar. 29, 2019, 15 pages.

International Search Report and Written Opinion for International Patent Application No. PCT/IB2019/050642, dated Apr. 12, 2019, 12 pages.

International Search Report and Written Opinion for International Patent Application No. PCT/IB2019/051629, dated Jun. 17, 2019, 14 pages.

International Search Report and Written Opinion for International Patent Application No. PCT/GB2019/052222, dated Nov. 12, 2019, 17 pages.

International Search Report and Written Opinion for International Patent Application No. PCT/GB2020/050188, dated Mar. 31, 2020, 12 pages.

Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.

Narayanan, et al., "A multi-view context-aware approach to Android malware detection and malicious code localization." Empir Software Eng (2018); 23: 1222-1274. Epub Aug. 30, 2017.

Rudd, et al., "MEADE: Towards a Malicious Email Attachment Detection Engine", 2018 IEEE International Symposium on Technologies for Homeland Security (HST), IEEE, Oct. 23, 2018, pp. 1-7.

Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.

Sanghani, et al., "Personalized spam filtering using incremental training of support vector machine". 2016 International Conference on Computing, Analytics and Security Trends (CAST), IEEE Dec. 19, 2016, pp. 323-328, 6 pages.

Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.

Sethi and Kantardzic, "Handling adversarial concept drift in streaming data". Expert Systems With Applications (May 1, 2018); 97: 18-40. Available online Dec. 11, 2017.

Tian, et al., "An automated classification system based on the strings of trojan and virus families." Malicious and Unwanted Software (MALWARE); 2009 4th International Conference, Piscataway, NJ, USA, Oct. 13, 2009, pp. 23-30, 8 pages.

Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.

Notice of Allowance in U.S. Appl. No. 15/727,035, dated Dec. 27, 2019, 7 pages.

* cited by examiner

METHODS AND APPARATUS FOR DETECTION OF MALICIOUS DOCUMENTS USING MACHINE LEARNING

CROSS-REFERENCE TO RELATED APPLICATIONS

This application claims priority to and the benefit of U.S. Provisional Patent Application No. 62/622,440, filed Jan. 26, 2018 and titled "Methods and Apparatus for Detection of Malicious Documents Using Machine Learning," the content of which is incorporated herein by reference in its entirety.

BACKGROUND

Some known machine learning tools can be used to assess the maliciousness of software files. Such tools, however, are typically applicable to only a single file format, or are otherwise limited in their applicability to multiple file formats. Thus, a need exists for a machine learning tool that can detect malicious activity across a wide variety of file formats.

SUMMARY

In some embodiments, an apparatus for detecting malicious files includes a memory and a processor communicatively coupled to the memory. The processor receives multiple potentially malicious files. A first potentially malicious file has a first file format (e.g., an Object Linking and Embedding 2.0 (OLE2) format), and a second potentially malicious file having a second file format (e.g., an Extensible Markup Language (XML) format) different than the first file format. The processor performs feature vector based maliciousness classification for the first and second potentially malicious files by extracting a first set of strings from the first potentially malicious file, and extracting a second set of strings from the second potentially malicious file. Each string in the sets of strings can be delimited by a delimiter including at least one of: a space, a "<", a ">", a "/", or a "\". A first feature vector is defined based on a length of each string from the first set of strings, and a second feature vector is defined based on a length of each string from the second set of strings. The processor provides the first feature vector as an input to a machine learning model to produce a maliciousness classification of the first potentially malicious file, and provides the second feature vector as an input to the machine learning model to produce a maliciousness classification of the second potentially malicious file.

In some embodiments, a non-transitory processor-readable medium stores code representing instructions to be executed by a processor. The code can cause the processor to receive a potentially malicious file having an archive format, and identify a central directory structure of the potentially malicious file. A set of strings can be extracted from the central directory structure, and a feature vector can be defined based on a length of each string from the set of strings. The feature vector can then be provided as an input to a machine learning model to produce a maliciousness classification of the potentially malicious file.

In some embodiments, a method for detecting malicious files includes training a machine learning model, using a length of each string from a first set of strings and a length of each string from a second set of strings, to produce a maliciousness classification for files having a first file format and files having a second file format different from the first file format. The first set of strings can be from a file having the first file format and the second set of strings can be from a file having the second file format. The method also includes defining a first feature vector based on a length of a set of strings within a first potentially malicious file having the first file format, and providing the first feature vector to the machine learning model to identify a maliciousness classification of the first potentially malicious file. The method also includes defining a second feature vector based on a length of a set of strings within a second potentially malicious file having the second file format, and providing the second feature vector to the machine learning model to identify a maliciousness classification of the second potentially malicious file.

DETAILED DESCRIPTION

Figure 1A:
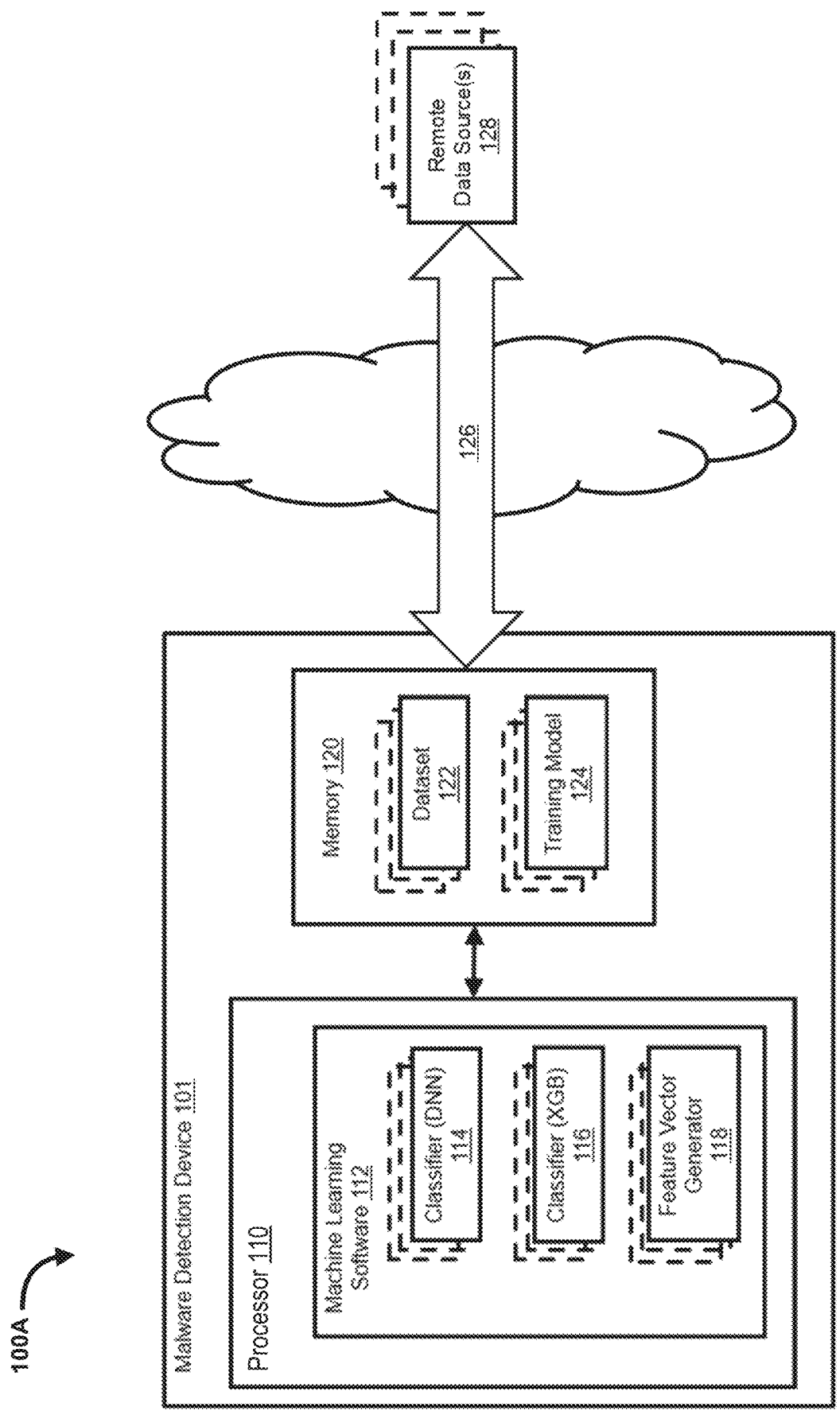
FIG. 1A is a block diagram showing components of a malware detection system, according to an embodiment.

Malware attacks are often performed by delivering a piece of malware to one or more users of a networked system via a software file which, on its face, may appear innocuous. For example, malicious email attacks can involve luring a user into downloading and/or opening a file attached to the email, and, from the adversary's perspective, it is generally undesirable for the user to immediately recognize the file as malicious even after the payload is executed. Ransomware, for example, takes time to index and encrypt targeted files. Thus, effective threat vectors, from an attacker's perspective, are those that are commonly used by the targeted organization(s) yet have sufficient flexibility to both preserve legitimate looking content/structure and embed an attack.

Machine learning can be used as a static countermeasure to detect malware within several file formats and/or types such as, for example, Microsoft® Office documents and ZIP archives. Known machine learning techniques for detecting malicious files, however, are generally developed and implemented for a single, particular file type and/or format. As such, using known approaches, multiple different machine learning models would need to be implemented to detect malicious files of multiple different file types and/or formats, thereby consuming considerable time and resources (both human and computer (e.g., storage, processing, etc.)).

Apparatus and methods set forth herein, by contrast, facilitate the detection of malicious files (including, but not limited to, emails, Microsoft® Office documents, archive files, etc.) across a wide variety of file types and/or formats, using a single machine learning model. In some embodiments, a system can detect malicious files across a wide variety of different file types and/or formats, using a single machine learning model. Feature vector based maliciousness classification can include extracting multiple strings from each of multiple potentially malicious files, and defining feature vectors (e.g., histograms) based on lengths of each string from the multiple strings. The feature vectors can be provided as inputs to a common/single machine learning model to produce maliciousness classifications for the multiple potentially malicious files.

In some embodiments, feed-forward deep neural networks and gradient boosted decision ensembles are used as classifiers. Although other types of neural networks, e.g., convolutional and recurrent, are available, they can be difficult to implement in practice due to large file sizes, computational overhead, and a dearth of generic byte-level embeddings. Also, although character-level embeddings have yielded success for certain antimalware problems, they may not work well for generic byte-level embeddings of arbitrary length. Thus, each document/archive can be transformed to a fixed-length feature vector before it is used to train a classifier. Examples set forth herein focus on static detection, for example, because machine learning models can be more effective with larger volumes of data. While antimalware stacks often include both static and dynamic components, dynamic detection can be expensive computationally and is often used to post-process detections from static engines, which operate much faster at scale. Dynamic detection is an important, complementary, and orthogonal area of research to methods and systems set forth herein.

Example systems and methods are described herein with reference to two example types of attachments (i.e., file types): word processing documents (e.g., Microsoft® Office documents) and archive documents (e.g., ZIP archives), however the systems and methods of the present disclosure can (alternatively or in addition) be used with other types and/or formats of documents and attachments. Malicious Microsoft® Office documents can be difficult to detect, for example because they leverage ubiquitous functionalities that serve other purposes as well. For example, Microsoft® Office documents allow embedding of multimedia, Visual Basic for Applications (VBA) macros, JavaScript, and even executable binaries to enhance functionality, usability, and aesthetics. These capabilities have led to high-quality office software that is user-friendly, straightforward to augment, and aesthetically pleasing, by design. Such capabilities, however, can also be vectors for embedding malicious code. While such threat vectors could be mitigated, e.g., by removing support for embedded VBA macros, such approaches can be undesirable or infeasible in practice, for example since consumers of commercial software tend to favor functionality and aesthetics over security. Thus, when securing against Microsoft® Office document vulnerabilities, security researchers and practitioners often walk a thin line between reducing consumer functionality on the one hand, and mitigating the spread and execution of malware on the other.

Malware, as used herein, can refer to any malicious software (e.g., software applications or programs) that can compromise one or more functions of a compute device, access data of the compute device in an unauthorized way, or cause any other type of harm to the compute device. Examples of malware include, but are not limited to: adware, bots, keyloggers, bugs, ransomware, rootkits, spyware, trojan horses, viruses, worms, fileless malware, any hybrid combination of the foregoing, etc.

A distinction is drawn herein between "file type" and "file format." As used herein, file type refers to a specific kind of file and/or a file with a specific function (e.g., Microsoft® Word, OpenOffice Write, Adobe® PDF, LaTeX, WordPerfect, Microsoft® Works, Adobe® Photoshop, etc.). File types can be categorized as one or more of: word processing, spreadsheet, archive, compressed, computer-aided design (CAD), database, document, etc. File format refers to the manner in which information is encoded for storage in a file. As such, for a given file type, multiple file formats may be available (i.e., a single file, of a single file type, can be encoded using any of a variety of applicable file formats). Example file formats include (but are not limited to) Extensible Markup Language (XML), Open XML, and Object Linking and Embedding (OLE2). As an example, a Microsoft® Word file type can have either an XML file format (.docx) or an OLE2 file format (.doc).

Archives (e.g., ZIP files, Roshal Archive (RAR) files) are even less constrained in the format of their internal contents than office documents, and can be packed internally with various file types. The inherent compression of archive contents has led to their popularity for exchanging documents over email. However, an otherwise benign archive can be made malicious by insertion of one or more malicious files. In both malicious and benign settings, archives have been used to store code fragments that are later executed by software external to the archive, or conversely, archives have been embedded into other programs to form self-extracting archives.

In, for example, a canonical malicious use-case, archives are distributed via phishing techniques, such as impersonating an important contact, perhaps via a spoofed email header, with the objective that the victim will unpack and run the archive's contents, e.g., a malicious JavaScript file executed outside of a browser sandbox. Such techniques have become increasingly common for malware propagation.

Due to the unconstrained types of content that can be embedded into office documents and archives, machine learning can be used to detect malicious files. Unlike signature-based engines, machine learning offers the advantage that a machine learning model can learn to generalize malicious behavior, and potentially generalize to new malware types. Systems and methods shown and described herein illustrate a machine-learned static scanner for such file types and/or formats, developed by leveraging techniques that have worked well for engines that detect other types of malware.

Modern office documents generally fall into one of two file formats: the OLE2 standard and the newer XML standard. Microsoft® Office's Word, Excel, and PowerPoint programs, along with analogous open source programs typically save OLE2 standard documents with .doc, .xls, and .ppt extensions and XML standard documents with .docx, .xlsx, and .pptx extensions. The OLE2 standard was set forth by Microsoft® and is also known as the Compound File Binary Format or Common Document File Format. OLE2 documents can be viewed as their own file-systems, analogous to file allocation tables (FATs), wherein embedded streams are accessed via an index table. These streams can be viewed as sub-files and contain text, Visual Basic for Applications (VBA) macros, JavaScript, formatting objects, images, and even executable binary code.

Open XML formatted office documents contain similar objects, but are compressed as archives via ZIP standard compression. Within each archive, the path to the embedded content is specified via XML. The user interface unpacks and renders relevant content within the ZIP archive. Although the file format is different from OLE2, the types of embedded content contained are similar between the two formats. Open XML office documents are thus special cases of ZIP archives, with a grounded well-defined structure, and in fact many archive file types are special cases of the ZIP format, including Java Archives (JARs), Android packages (APKs), and browser extensions.

Examples of archive file types (and their associated extensions) that can be analyzed for maliciousness by systems and methods of the present disclosure include archive file types that have an underlying zip format, or a derived format that is similar to the zip format, including but not limited to: zip, zipx, Android APK, Java® JAR, Apple® iOS App Store Package (IPA), electronic publication (EPUB), Office Open XML (Microsoft®), Open Packaging Conventions, OpenDocument (ODF), Cross-Platform Install (XPI (Mozilla Extensions)), Cabinet (.cab), and Web application Archive (WAR (.war)). Other examples of archive file types (and their associated extensions) that can be analyzed for maliciousness by systems and methods of the present disclosure include, but are not limited to: Unix archiver files (.a, .ar), cpio (.cpio), Shell archive (.shar), .LBR (.lbr), ISO-9660 (.iso), Mozilla Archive Format (.mar), SeqBoz (.sbx), Tape archive (.tar), bzip2 (.bz2), Freeze/melt (.F), gzip (.gz), lzip(.lz), lzma (.lzma), lzop (.lzo), rzip (.rz), sfArk (.sfark)., Snappy (.sz), SQ (.?Q?), CRUNCH (.?Z?), xz (.xz), defalte (.z), compress (.Z), 7z (0.7z), 7zX (.s7z), ACE (.ace), AFA (.afa), ALZip (.alz), ARC (.arc), ARJ (.arj), B1 (.b1), B6Z (.b6z), Scifer (.ba), BlakHole (.bh), Compressia archive (.car), Compact File Set (.cfs), Compact Pro (.cpt), Disk Archiver (.dar), DiskDoubler (.dd), DGCA (.dgc), Apple Disk Image (.dmg), EAR (.ear), GCA (.gca), WinHKI (.hki), ICE (.ice), KGB Archiver (.kgb), LHA (.lzh, lha), LZX (.lzx), PAK (.pak), PartImage (.partimg), PAQ (.paq6, .paq7, .paq8), PeaZip (.pea), PIM (.pim), Packlt (.pit), Quadruple D (.qda), RAR (.rar), RK and WinRK (.rk), Self Dissolving ARChive (.sda), Self Extracting Archive (.sea), Scifer (.sen), Self Extracting Archive (.sfx), NuFX (.shk), StuffIt (.sit), Stuffit X (.sitx), SQX (.sqx), tar with gzip, compress, bzip2, lzma or xz (.tar.gz, .tgz, .tar.Z, .tar.bz2, .tbz2, .tar.lzma, .tlz, .tar.xz, .txz), UltraCompressor II (.uc, .uc0, .uc2, .ucn, .ur2, .ue2), PerfectCompress (.uca), UHarc (.uha), Windows Image (.wim), XAR (.xar), KiriKiri (.xp3), YZ1 (.yz1), zoo (.zoo), ZPAQ (.zpaq), Zzip (.zz), dvdisaster error-correction file (.ecc), Parchive file (.par, .par2), and/or WinRAR recovery volume (.rev).

FIG. 1A is a block diagram showing components of a malware detection system 100A, according to an embodiment. As shown in FIG. 1A, the malware detection system 100A includes a malware detection device 101 including a processor 110 (e.g., an email attachment scanner) and a non-transitory memory 120 in operable communication with the processor/server 110. The processor can be, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools.

The memory 120 can be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the classifier (DNN) 114, the classifier (XGB) 116, the feature vector generator 118, etc.). In some implementations, the memory 120 can be a portable memory (e.g., a flash drive, a portable hard disk, and/or the like) that can be operatively coupled to the processor 110. In other instances, the memory can be remotely operatively coupled with the malware detection device. For example, a remote database server can be operatively coupled to the malware detection device.

The malware detection device 101 can be a server or an electronic device operable by a user, including but not limited to a personal computer (e.g., a desktop and/or laptop computer), a mobile device (e.g., a smartphone, a table device and/or other mobile device, for example including a user interface), and/or a similar electronic device. The malware detection device 101 can be configured to communicate with a communications network 126. The processor 110 can be referred to as an email attachment scanner, is implemented in hardware and/or software, and includes machine learning software 112. The machine learning software 112 can include one or more classifiers 114 of the DNN type, one or more classifiers 116 of the XGB type, and/or one or more feature vector generators 118. Although shown and described with reference to FIG. 1A as including DNN and XGB classifiers, one or more other types of machine learning classifiers can be used as alternatives or in addition to DNN and/or XGB classifiers (e.g., a linear support vector machine, a random forest, a decision tree, etc.). The memory 120 includes one or more datasets 112 (e.g., a VirusTotal dataset and/or a Common Crawl dataset, as described in further detail below) and one or more training models 124. The malware detection device 101 can be configured for bidirectional communication and data transmission, e.g., via a network 126 (e.g., the Internet), with one or more remote data sources 128.

In some implementations of the malware detection system 100A of FIG. 1A, the processor 110 is configured to implement an analyzer and a threat analyzer, and via the analyzer, can receive a potentially malicious file and calculate an attribute associated with the potentially malicious file. The attribute can be at least one of: (1) an indication of how often a combination of (A) a hash value range and (B) a string length range (e.g., 1-15 characters, 16-31 characters, etc., or 1-63 characters, 64-123 characters, etc.) occurs within the potentially malicious file, (2) an indication of how often a combination of (A) an informational entropy range and (B)

a byte value range occurs within the potentially malicious file, or (3) an indication of how often a combination of (A) an informational entropy range and (B) a byte standard deviation range, occurs within the potentially malicious file. The threat analyzer (e.g., including a classifier) can calculate a probability that the potentially malicious file is malicious based on the attribute value, and/or using a trained machine learning model.

Figure 1B:
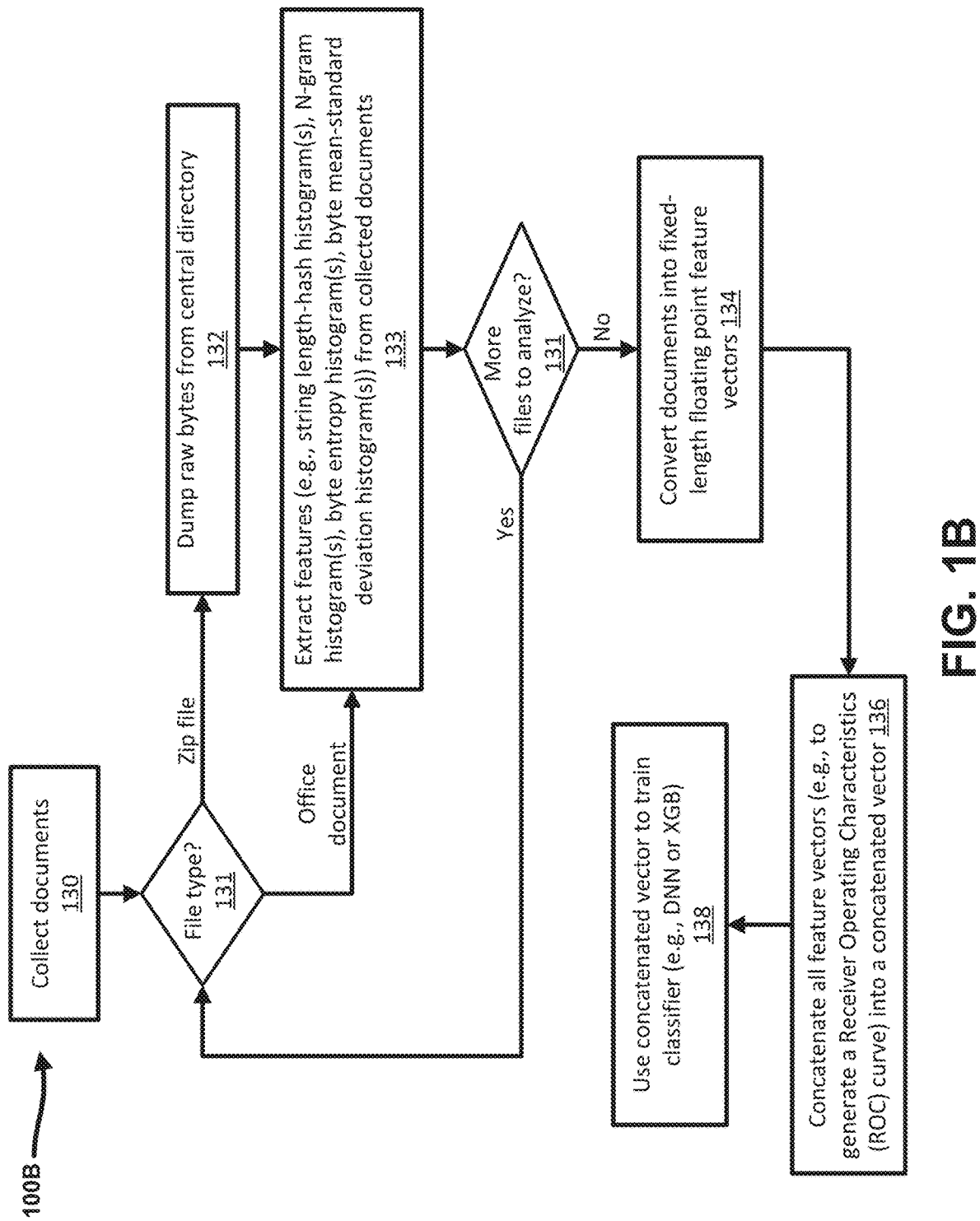
FIG. 1B is a flow chart showing an anti-malware machine learning process, according to an embodiment.

FIG. 1B is a flow chart showing an anti-malware machine learning process 100B, executable by the malware detection system 100A of FIG. 1A, according to an embodiment. As shown in FIG. 1B, the anti-malware machine learning process 100B begins with the collection of documents (or files) 130, and for each collected document, an analysis and transformation are performed as described herein. A file type is determined/detected at 131, and if the file type is a ZIP archive (or other archive file type, examples of which are provided herein), the process proceeds to step 132 where raw bytes are "dumped" (i.e., read) from the central directory of the ZIP archive, and subsequently, at 133, features (e.g., data) of the document files are extracted (with the extraction being limited to the central directory). In other implementations, extracted features of the document files are not limited to the central directory contents, and include features extracted from elsewhere in the document files, either in combination with or instead of the central directory contents (or a portion thereof). If the file type is determined at 131 to be an office document (or any other document/file that is not of the archive file type), the process proceeds directly to the feature extraction at step 133 (with the extraction based on the document as a whole). For example, if a document that is being processed using process 100B is a regular XML file (non-archive), the process flow will proceed from step 131 directly to the extraction step at 133 (without passing step 132). Alternatively, if the document that is being processed using process 100B is an archive-type XML file (e.g., Office Open XML), the process flow will proceed from step 131, to the central directory dump at 132, to the extraction step at 133 (the latter step being restricted, in some embodiments, to the central directory, however in other embodiments, extracted features of the document files are not limited to the central directory contents, as discussed above).

As described in greater detail below, the features (e.g., byte values, string values, string lengths, etc.) extracted from ZIP archive files and/or office documents can be used to derive one or more: string length-hash algorithms, N-gram histograms, byte entropy histograms, byte mean-standard deviation histograms and/or the like. After the feature extraction is performed for a given document, a determination is made at 131 as to whether there are additional document files, from the documents collected at 130, that are to be analyzed/extracted. If so, the process returns to the file type determination step 131, for the next document in the batch of collected documents, until no further unanalyzed documents remain. Next, the extracted features of the collected documents are converted into fixed-length floating point feature vectors at 134, and the feature vectors are concatenated together, at 136, into a concatenated vector. The concatenated vector can take the form, for example, of a Receiver Operating Characteristics (ROC) curve, as described and shown in greater detail below. At 138, the concatenated vector can be used to train one or more classifiers (e.g., a DNN and/or XGB classifier), as part of the machine learning process, for example, to refine one or more data models.

Figure 2:
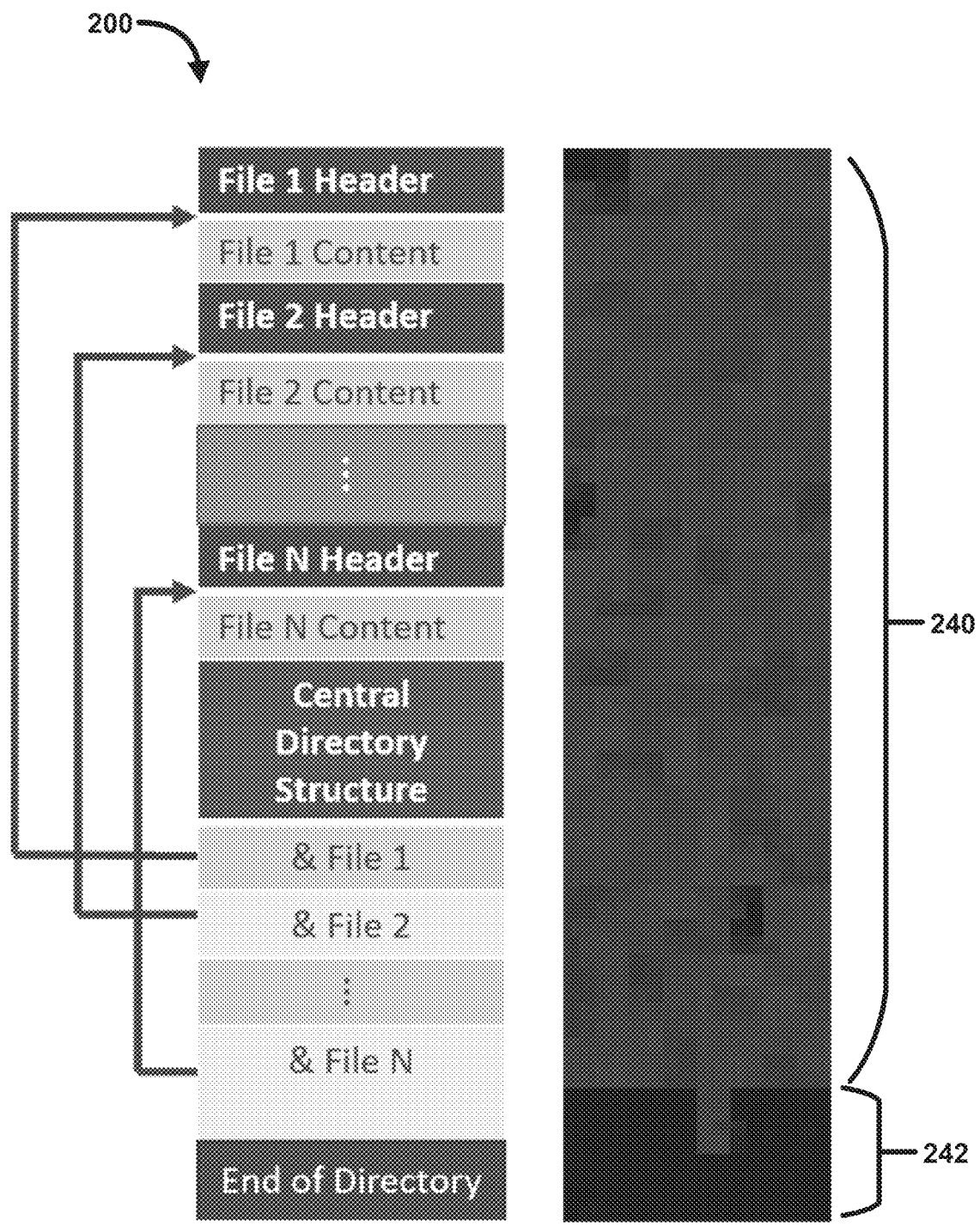
FIG. 2 shows a file structure and entropy heat map for a ZIP archive, according to an embodiment.

The example structure of a Zip archive is shown on the left side of FIG. 2. The central directory structure, located near the end of the directory structure at the end of the archive, contains an index of filenames, relative addresses, references, and metadata about relevant files residing in the archive. The references in the central directory structure point to file headers, which contain additional metadata, and are stacked above (or "followed by") compressed versions of the files. The right side of FIG. 2 shows an entropy heat map of a ZIP archive plotted over a Hilbert Curve, generated using the BinVis tool. The high-entropy regions (generally region 240—bright/magenta) correspond to file contents, while the lower-entropy regions (generally region 242—dark blue/black) correspond to metadata. One can see that this archive contains three header files (see arrows A, B and C), and one can discern the central directory structure at the end (region 242).

Since files having an archive file type can be large, in some implementations, the central directory structure (as shown and discussed above with reference to FIG. 2) is identified and isolated such that a feature vector is defined based on contents of the central directory portion of the archive file and not the remaining portions of the archive. The central directory structure can be identified, for example, based on a byte entropy of the central directory structure and/or based on the central directory structure being at the end of the file. This step of extracting the central directory contents can be performed, for example, at step 132 of FIG. 1B "Dump raw bytes from central directory).

To train the classifiers as described above, fixed-size floating point vector representations of fields from input files/archives can be generated. From a practical perspective, these feature space representations can be reasonably efficient to extract, particularly for archives, which can be large (e.g., hundreds of gigabytes in length). Although concatenations of features extracted from different fields of files are used in the experiments set forth herein, in this section, the methods used to extract features from an arbitrary sequence of bytes are described. Example methods are described in Joshua Saxe and Konstantin Berlin: Expose: A character-level convolutional neural network with embeddings for detecting malicious urls, file paths and registry keys. arXiv preprint arXiv: 1702.08568, 2017, which is incorporated herein by reference in its entirety.

N-gram Histograms can be derived from taking N-gram frequencies over raw bytes and/or strings. For example, 3,4,5, and/or 6-gram representations can be used, and a hash function can be applied to fix the dimensionality of the input feature space. Specifically, in such instances, a feature vector generator (e.g., feature vector generator 118 of FIG. 1A) can generate a set of n-gram representations having n-grams of varying length 'n' (e.g., including a unigram, bigram, 3-gram, 4-gram, 5-gram representations, etc.). The n-gram representations can serve to 'normalize' the raw bytes and/or strings by defining a bounded feature space suitable for use as an input for machine learning. In some implementations, the feature vector generator can be configured to provide each n-gram as in input to a hash function to define a feature vector based on the representation-grams of varying lengths. Such n-grams can be defined using a rolling and/or sliding window such that each byte and/or character can be in multiple n-grams of the same size and/or of different sizes. The feature vector generator can be configured to input each n-gram to a hash function to produce a hash value for that n-gram and, using the hash values, define a feature vector, such as of pre-determined length and/or of variable length.

In some implementations, the feature vector generator can be configured to define the feature vector by counting each n-gram that is hashed or mapped into each bucket of the feature vector. For example, in some implementations, the feature vector generator can be configured to define the feature vector by providing, as an input to a hash function each n-gram. In some implementations, the feature vector generator can be configured to implement any other suitable process (e.g., mapping or transform process).

Byte Entropy Features can be obtained by taking a fixed-size sliding window, with a given stride, over a sequence of bytes and computing the entropy of each window. For each byte value, for a given window, the byte entropy calculation in that window (or zero) is stored, and a 2D histogram is taken over (byte value, entropy) pairs. The rasterized histogram becomes the fixed-size feature vector. According to some embodiments, a window size of 1024 with a stride of 256 can be used. See e.g., U.S. Pat. No. 9,690,938.

In some implementations, a file is partitioned or subdivided by passing a sliding file window over the bytes in the file. An informational entropy calculator can be used to calculate an informational entropy value for a file window based on a number of occurrences of each byte value. The informational entropy value indicates the degree of variance and/or randomness of the data (e.g., can indicate whether there is a strong concentration of particular byte values in the file window, and/or whether there is a more even distribution of observed byte values in the file window). For example, the informational entropy value of a file window can be higher for file windows with more variation in byte values and/or byte sequences, than it may be for file windows with more uniformity in terms of represented byte values and/or byte sequences. For example, the informational entropy of a file window including only two distinct byte values (e.g., two values repeated across a 256 byte window) will be less than the information entropy of a file window including random values with very little repetition of values across the file window. The informational entropy of a given file window can be paired with each value within that file window to define a histogram that indicates the number of occurrences in the file of that byte value /informational entropy combination (see e.g., FIG. 7A). This can be used as an input to the machine learning model to identify whether the file is malware. In some embodiments, the informational entropy calculator can also identify and/or count a standard deviation of the byte values within a window, a string length of strings within the file, a string hash value associated with the strings within a file, and/or any other suitable characteristic.

Figure 7A:
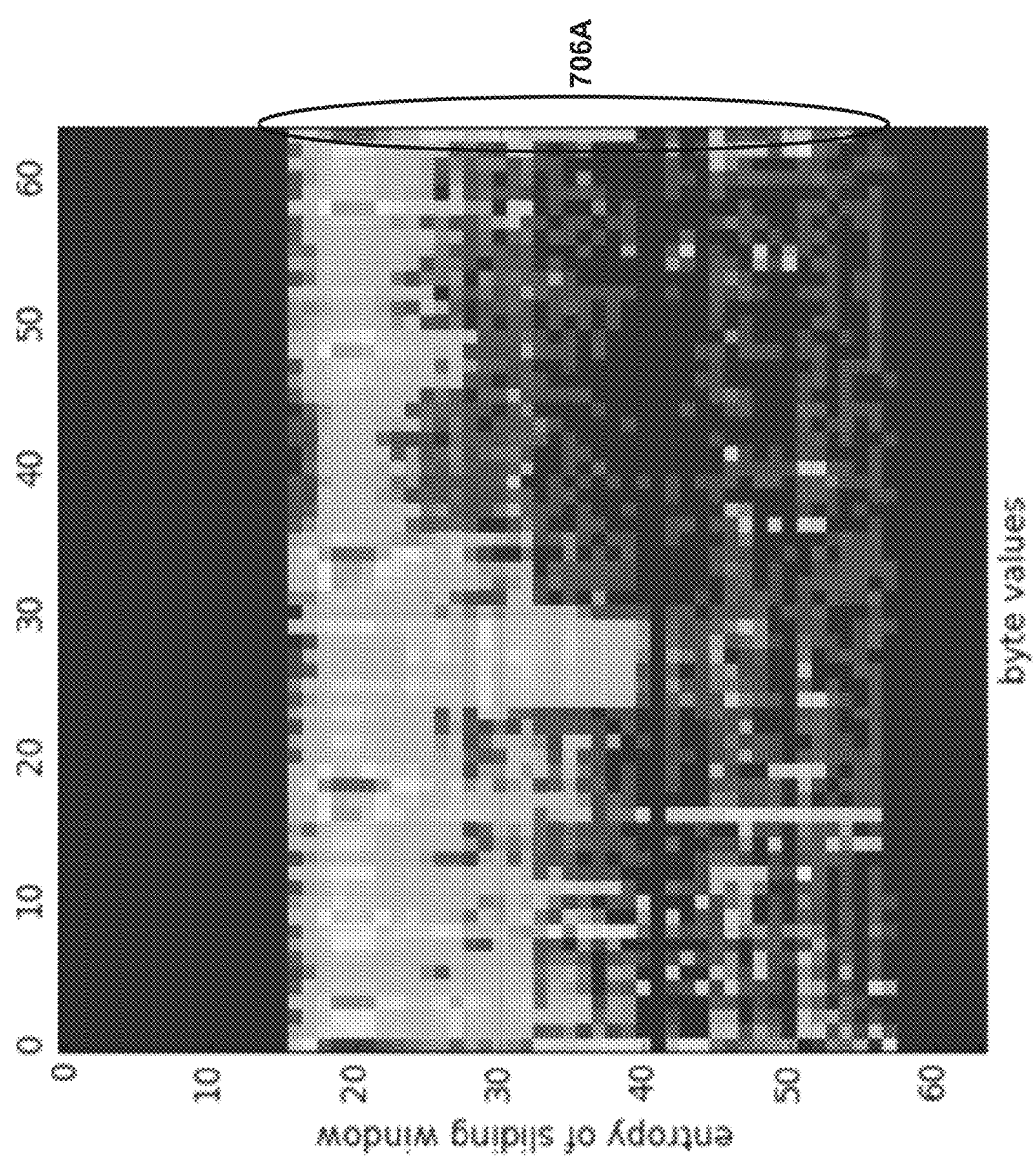
FIG. 7A is an informational entropy vs. byte values histogram for a file, according to an embodiment.

FIG. 7A is an informational entropy vs. byte values histogram for a file, according to an embodiment. Referring to FIG. 7A, in some implementations, a collection of informational entropy values are calculated based on a file (e.g., as discussed above in the Byte Entropy Features section). The example histogram in FIG. 7A plots an indication of the entropy of a sliding file window against an indication of byte values within a sliding window having that entropy, and can provide a visualization for a frequency at which various bytes appear in file windows having a specific entropy. Specifically, in the example of FIG. 7A, the entropy values are divided into 64 different bins and/or buckets. Similarly stated, the entropy value for each sliding window is identified and/or normalized as being within one of 64 different buckets. For example, the byte values are normalized as being within one of 64 different bins and/or buckets, based on, for example, being within a particular range of values. Thus, in this example, since each byte can represent 256 different values, each bin includes a range of 4 different byte values. In other embodiments, any suitable number of bins and/or buckets can be used to represent, normalize and/or group the entropy values and/or the byte values of the file windows. In some embodiments, for example, 2, 8, 16, 32, 128 and/or any other suitable number of bins and/or buckets can be used to represent the entropy and/or byte values of a file window.

In the example shown in FIG. 7A, each square and/or point in the graph/histogram represents an entropy/byte value bucket. Similarly stated, each square represents a combination of (1) an entropy value (or group or range of entropy values) for a sliding window, and (2) a byte value (or group or range of byte values) found within a sliding window having that entropy value. For example, 706A shows the count values (shown as shading) for the file windows in which a byte value within the bucket 63 (e.g., a byte value in the file window falls within bucket or bin 63) appears in the file. The shading (and/or color) of each square and/or point of the graph/histogram, represents how often the combination of that entropy value (or group or range of entropy values) and that byte value (or group or range of byte values) occurs within the file. Thus, a square will be lighter if that combination frequently occurs within the file windows of the file and darker if that combination does not frequently occur within the file windows of the file. Thus, the shading (or underlying value) of the square for that combination can be an aggregate for the count values for the file windows within a file. For example, if a first file window of a file has an entropy X and includes four byte values of 100, and a second file window of the file has an entropy X and includes seven byte values of 100, the aggregate count value representing the number of combinations of entropy value X and byte value 100 for that particular file would be eleven (and could be represented as a particular color or shading on a graph/histogram). Such a value (and/or set of values for each combination in a file) can then be input into a machine learning model to train the machine learning model and/or to identify a file as containing malicious code, as described in further detail herein. In other embodiments, any other suitable method (e.g., a numerical value or score used by the threat analyzer 114 of FIG. 1) can be used to represent the frequency of the combination within the file. The brightness of the value in the histogram can vary according to color gradient, and/or a similar mechanism.

In some implementations, file windows can be arranged in the histogram based on the informational entropy value of the file window (e.g., file windows with higher informational entropy values being shown first or last, and/or the like). Thus, the order of the representation of the data in histogram does not significantly change if a portion of the file sample is changed (e.g., if a user adds additional data to a text file, and/or the like), as the histogram does not rely on the manner in which bytes are sequenced and/or stored in the file sample to display information about the file sample. Thus, for example, if a malware file including an image is modified to be included with a different image, while the portion of the histogram associated with the image might change, the portion of the histogram relating to the malware would not change since the byte windows relating to the malware would have the same entropy. This allows the malware sample to be analyzed and recognized regardless of the code and/or instructions around the malware sample.

Using a histogram that does not rely on the order of bytes in the file sample also allows the threat analyzer 114 to analyze the file sample without prior knowledge of the nature of a file being analyzed (e.g., without knowing whether a file contains text, and/or without knowing whether image files typically store particular byte values at particular locations). In other words, the histogram can serve as a format-agnostic representation of the file sample, such that the threat analyzer 114 can determine attributes of the file sample, and/or a threat level for the file sample, without prior knowledge of the type and/or format of file being analyzed. The values associated with the histogram of FIG. 7A (e.g., the value of the combination represented by the shading (and/or color) of each square, the entropy bucket, the byte value bucket, the entropy value, the byte values, and/or the like) can be used as input into a machine learning model to identify potential malware, as discussed in further detail herein.

String Length-Hash Features can be obtained by applying delimiters to a sequence of bytes to extract strings and taking frequency histograms of the strings. The hash function noted above can be applied over multiple logarithmic scales on the string length, and the resultant histograms can be concatenated into a fixed-size vector. See, e.g., Joshua Saxe and Konstantin Berlin. Deep neural network based malware detection using two dimensional binary program features. In Malicious and Unwanted Software (MALWARE), 2015 10th International Conference on, pages 11-20. IEEE, 2015, and U.S. Pat. No. 9,690,938, titled "Methods and Apparatus for Machine Learning Based Malware Detection," both of which are incorporated herein by reference in their entireties.

In some implementations, a parameter associated with a combination of string lengths (or a range or group of string lengths) for a file and a string hash value (or group or range of string hash values) found within that file can be defined. The string length can be a length of a string (or a group of characters) under analysis and the string hash value can be an output of a hash value using the byte values of the characters of that string as input (or any other suitable value associated with that string). This can allow calculation of a number of combinations of string lengths and string hash values within a file. Such a parameter can be plotted on a histogram with, for example, the x-axis representing the string length value for the string and the y-axis representing the string hash value (see e.g., FIG. 7B). The values can be divided into different bins and/or buckets to be represented on the plot. Each square and/or point in the graph/histogram can represent string length bucket/string hash value bucket combination. Similarly stated, each square can represent a combination of string length (or group or range of string lengths) and a string hash value (or group or range of string hash values) for the file. The shading (and/or color) of each square and/or point of the graph/histogram can represent how often the combination of that string length (or group or range of string lengths) and that string hash value (or group of string hash values) occurs within the file. This value can be used as an input to the machine learning model to identify whether the file is malware.

Figure 7B:
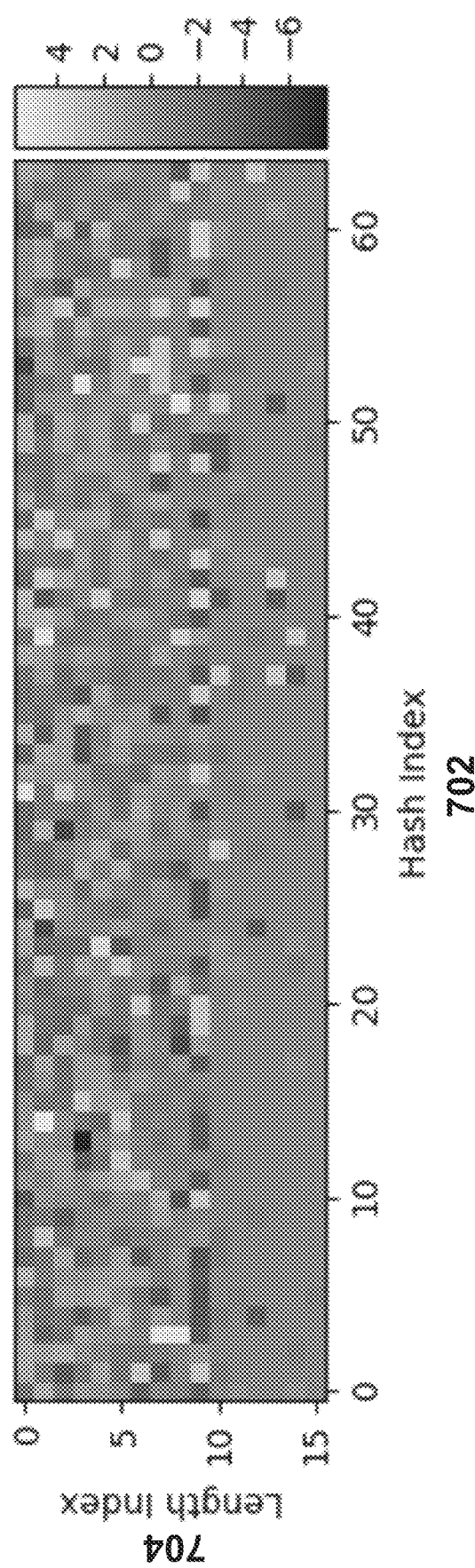
FIG. 7B is a hash value vs. string lengths histogram for a file, according to an embodiment.

FIG. 7B is a string hash value vs. string length histogram for a file, according to an embodiment. Referring to FIG. 7B, in some implementations, a collection of hash values (or "hash index" values) for the strings within a file are calculated (e.g., as discussed above in the String Length-Hash Features section). The example histogram in FIG. 7B plots indications of the hash index values 702 against indications of the string lengths (or "length index" values) 704 of the strings on which those hash values are based. The example histogram of FIG. 7B can be generated by applying a hash function to strings of a file (the strings identified/segregated from one another based on delimiters), for example over multiple logarithmic scales on the string length, and can provide a visualization for a frequency at which various combinations of string lengths and hash values appear in files. Specifically, in the example of FIG. 7B, the string hash values are divided into 64 different bins and/or buckets. Similarly stated, the string hash values are identified and/or normalized as being within one of 64 different buckets. For example, the string lengths are normalized as being within one of 64 different bins and/or buckets, based on, for example, being within a particular range of values. Any suitable number of bins and/or buckets can be used to represent, normalize and/or group the hash values and/or the string lengths of the file windows. In some embodiments, for example, 2, 8, 16, 32, 128 and/or any other suitable number of bins and/or buckets can be used to represent the hash values and/or string lengths of a file.

In the example shown in FIG. 7B, each square and/or point in the graph/histogram represents a hash value/string length bucket. Similarly stated, each square represents a combination of (1) a string hash index value (or group or range of string hash index values), and (2) an associated string length index value (or group or range of string length index values). The shading (and/or color) of each square and/or point of the graph/histogram, represents how often the combination of that string hash index value (or group or range of string hash index values) and that string length index value (or group or range of string length index values) occurs within the file. Thus, a square will be lighter if that combination frequently occurs within the file windows of the file and darker if that combination does not frequently occur within the file. Thus, the shading (or underlying value) of the square for that combination can be an aggregate for the count values for the file. Such a value (and/or set of values for each combination in a file) can then be input into a machine learning model to train the machine learning model and/or to identify a file as containing malicious code, as described in further detail herein. In other embodiments, any other suitable method (e.g., a numerical value or score) can be used to represent the frequency of the combination within the file. The brightness of the value in the histogram can vary according to color gradient, and/or a similar mechanism.

Byte Mean-Standard Deviation Features can be obtained using a similar fixed-size sliding window of given stride, but this time, the 2D histogram is taken over pairs of (byte mean, byte standard deviation) within each window. The rasterized histogram becomes the fixed-size feature vector. Similar to byte entropy features, a window size of 1024 with a stride of 256 can be used. See e.g., U.S. Pat. No. 9,690,938.

According to some implementations, for example implemented using the malware detection system of FIG. 1A and/or the anti-malware machine learning process of FIG. 1B, deep neural networks (DNNs) and gradient boosted decision tree ensembles can be used. While these classifiers are highly expressive and have advanced the state of the art in several problem domains, their formulations are quite different from one another.

Neural networks include functional compositions of layers, which map input vectors to output labels. The deeper the network, i.e., the more layers, the more expressive the composition, but also the greater the likelihood of overfitting. Neural networks with more than one hidden (non-input or output) layer are said to be "deep neural networks." In the present example, the input vector can be a numerical representation of bytes from a file, and the output is a scalar malicious or benign label. The (vector,label) pairs are provided during training for the model to learn the parameters of the composition. A DNN can be implemented using, for example, 4 hidden layers of size 1024 each with rectified linear unit (ReLU) activations (although any other number of layers and/or layer sizes can be used). At each layer, dropout and batch normalization regularization methods can be used, with a dropout ratio of 0.2. At the final output, a sigmoid cross-entropy loss function can be used:

$$J(x_i, y_i; \theta) = y_i \log \sigma(f(x_i); \theta) + (1 - y_i) \log(1 - \sigma(f(x_i); \theta));  \quad (1)$$

where $\theta$ corresponds to all parameters over the network, $x_i$ corresponds to the ith training example, $y_i$ corresponds to the label for that example, $f(x_i)$ corresponds to the preactivation output of the final layer, and $\sigma(\ )$ is the logistic sigmoid function. In some implementations, $\theta$ can be optimized using the Keras framework's default ADAM solver, with minibatch size of 10 k, and early stopping can be performed when loss over a validation set failed to decrease for 10 consecutive epochs.

Decision trees, instead of trying to learn a latent representation whereby data separates linearly, can partition the input feature space directly in a piecewise-linear manner. While they can fit extremely nonlinear datasets, the resultant decision boundaries also tend to exhibit extremely high variance. By aggregating an ensemble of trees, this variance can be decreased. Gradient boosting iteratively adds trees to the ensemble; given loss function $J(F(x; \theta); y)$, and classification function $F(x; \theta)$ for the ensemble, a subsequent tree is added to the ensemble at each iteration to fit pseudo-residuals of the training set, $$-\frac{dJ(F(xi; \theta), yi)}{dF(xi; \theta)}.$$

the subsequent tree's decisions are then weighted so as to substantially minimize the loss of the overall ensemble. In some implementations, for gradient boosted ensembles, a regularized logistic sigmoid cross-entropy loss function can be used, similar to that of the neural network described above (cf. Eq. 1), but unlike with the network, wherein the parameters are jointly optimized with respect to the cost function, the ensemble is iteratively refined with the addition of each decision tree—i.e., additional parameters are added to the model. In some implementations, for the hyperparameters, a maximum depth per tree of 6, a subsample ratio of 0.5 (on training data; not columns), and hyperparameter $\eta$ of 0.1 can be used. In some implementations, ten rounds can be used, without improvement in classification accuracy over a validation set as a stopping criterion for growing the ensemble.

Figure 8:
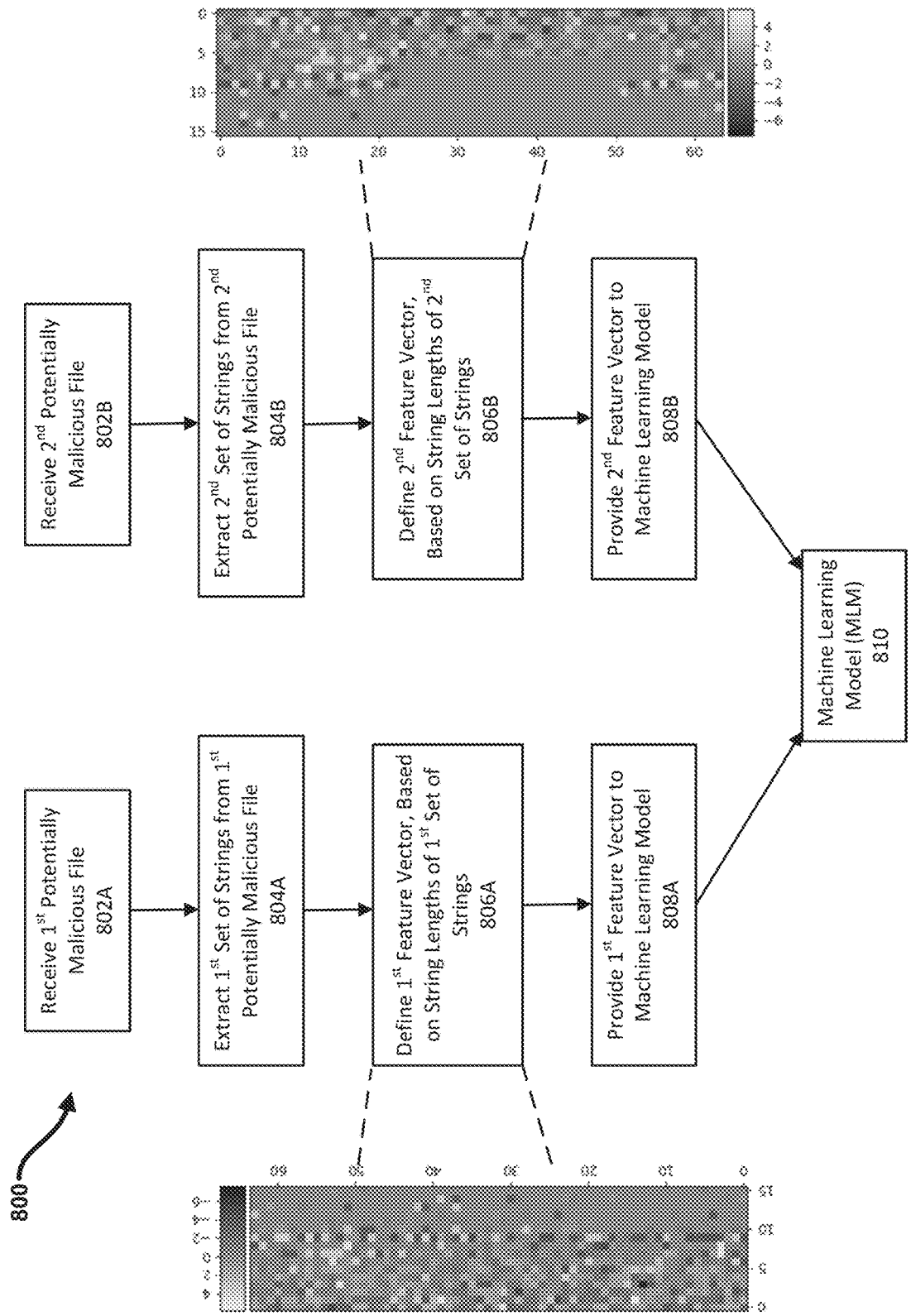
FIG. 8 is a flow chart showing a process for detecting malicious documents of multiple formats, using string length values as input, according to an embodiment.

In some embodiments, a system for detecting malicious files across a wide variety of file types and/or formats, using a single machine learning model includes a memory and a processor communicatively coupled to the memory, the memory storing processor-executable instructions to perform the process 800 of FIG. 8. As shown in FIG. 8, during operation, the processor receives multiple potentially malicious files (serially and/or concurrently, e.g., in batches)—a first potentially malicious file at 802A, and a second potentially malicious file at 802B. The first potentially malicious file has a first file format (e.g., OLE2), and a second potentially malicious file has a second file format (e.g., XML) that is different than the first file format. The processor performs feature vector based maliciousness classification for the first and second potentially malicious files by extracting, at 804A, a first set of strings from the first potentially malicious file, and extracting, at 804B, a second set of strings from the second potentially malicious file. Strings from the pluralities of strings can be detectable or delimited, for example, by a delimiter including at least one of: a space, a "<", a ">", a "/", or a "\". Thus, the processor can identify the characters between two delimiters (e.g., a space, a "<", a ">", a "/", or a "\") as a string.

The processor defines a first feature vector, at 806A, based on string lengths of the first set of strings, and defines a second feature vector, at 806B, based on string lengths of the second set of strings. The string lengths can be specified as an absolute numerical value (e.g., for string lengths of 4-10), and/or can be on a logarithmic scale (e.g., for string lengths closer to 10, to reduce the number of "bins," discussed further below). The feature vectors can be scaled (e.g., linearly or logarithmically) and/or can include, for example, an indication of how often a string from the first set of strings has a combination of a string length range and a string hash value range. The processor provides the first feature vector as an input to a machine learning model 810, at 808A, to produce a maliciousness classification of the first potentially malicious file, and provides the second feature vector as an input to the machine learning model 810, at 808B, to produce a maliciousness classification of the second potentially malicious file. The machine learning model (MLM) 810 can include, for example, a neural network (e.g., a deep neural network), a boosted classifier ensemble, or a decision tree. The maliciousness classifications can indicate whether the associated potentially malicious file is malicious or benign, can classify the associated potentially malicious file as a type of malware, and/or provide any other indication of maliciousness.

In some implementations, the system for detecting malicious files across a wide variety of file types/formats is configured to perform a remedial action based on the maliciousness classification(s) of the potentially malicious file (s), when the maliciousness classification(s) indicate that the potentially malicious file(s) is/are malicious. The remedial action can include at least one of: quarantining the first potentially malicious file, notifying a user that the first potentially malicious file is malicious, displaying an indication that the first potentially malicious file is malicious, removing the first potentially malicious file and/or the like.

Figure 9:
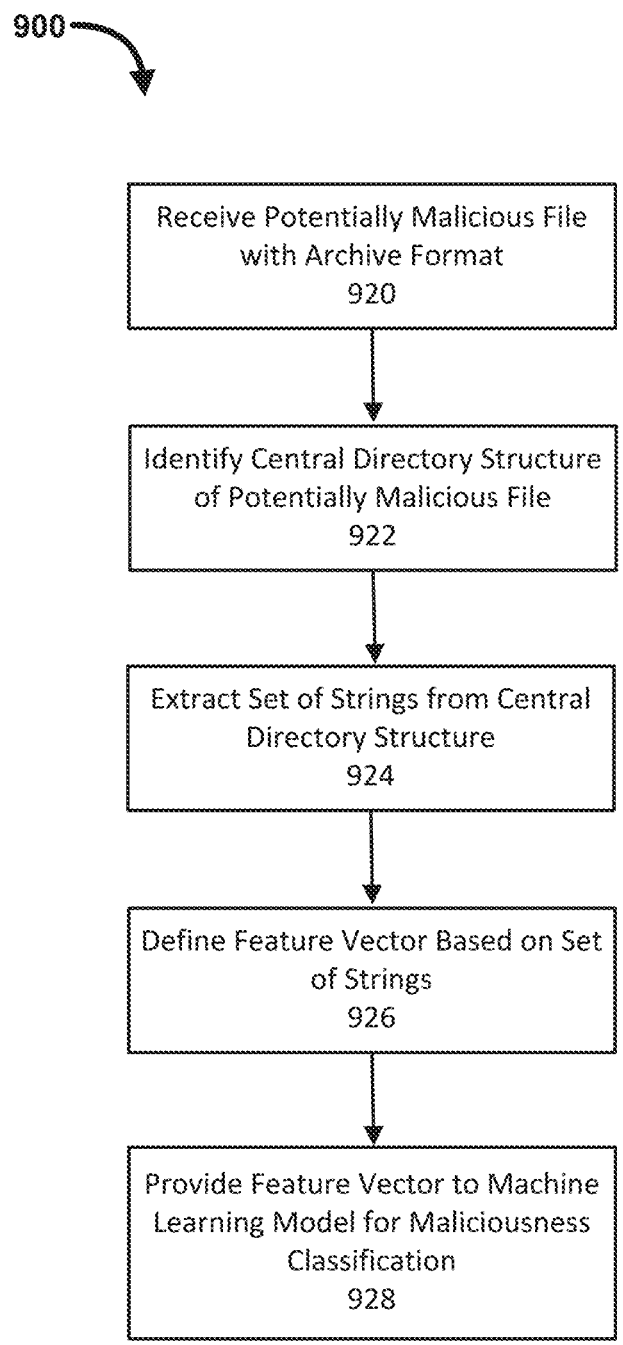
FIG. 9 is a flow chart showing a process for extracting central directory structures for archive files, according to an embodiment.

FIG. 9 is a flow chart showing a process for extracting central directory structures for archive files, according to an embodiment. As shown in FIG. 9, the process 900 (e.g., implementable by a processor based on code, stored in/on a non-transitory processor-readable medium and representing instructions to be executed by the processor) includes receiving, at 920, a potentially malicious file having an archive format. The archive format can be any of a Java archive (JAR) format, a ZIP format, an Android application package (APK) format and/or any other archive format. At 922, a central directory structure of the potentially malicious file is identified (e.g., based on a byte entropy of the central directory structure, based on the central directory structure being at the end of the file, etc.). At 924, a set of strings is extracted from the central directory structure, and a feature vector is defined at 926 based on a length of each string from the set of strings. The feature vector may not be based on strings of the potentially malicious file that are outside the central directory structure, and can include an indication of how often a string from the set of strings has a combination of a string length range and a string hash value range. The feature vector can then be provided as an input to a machine learning model (e.g., a deep neural network or a boosted classifier ensemble), at 928, to produce a maliciousness classification of the potentially malicious file.

Figure 10:
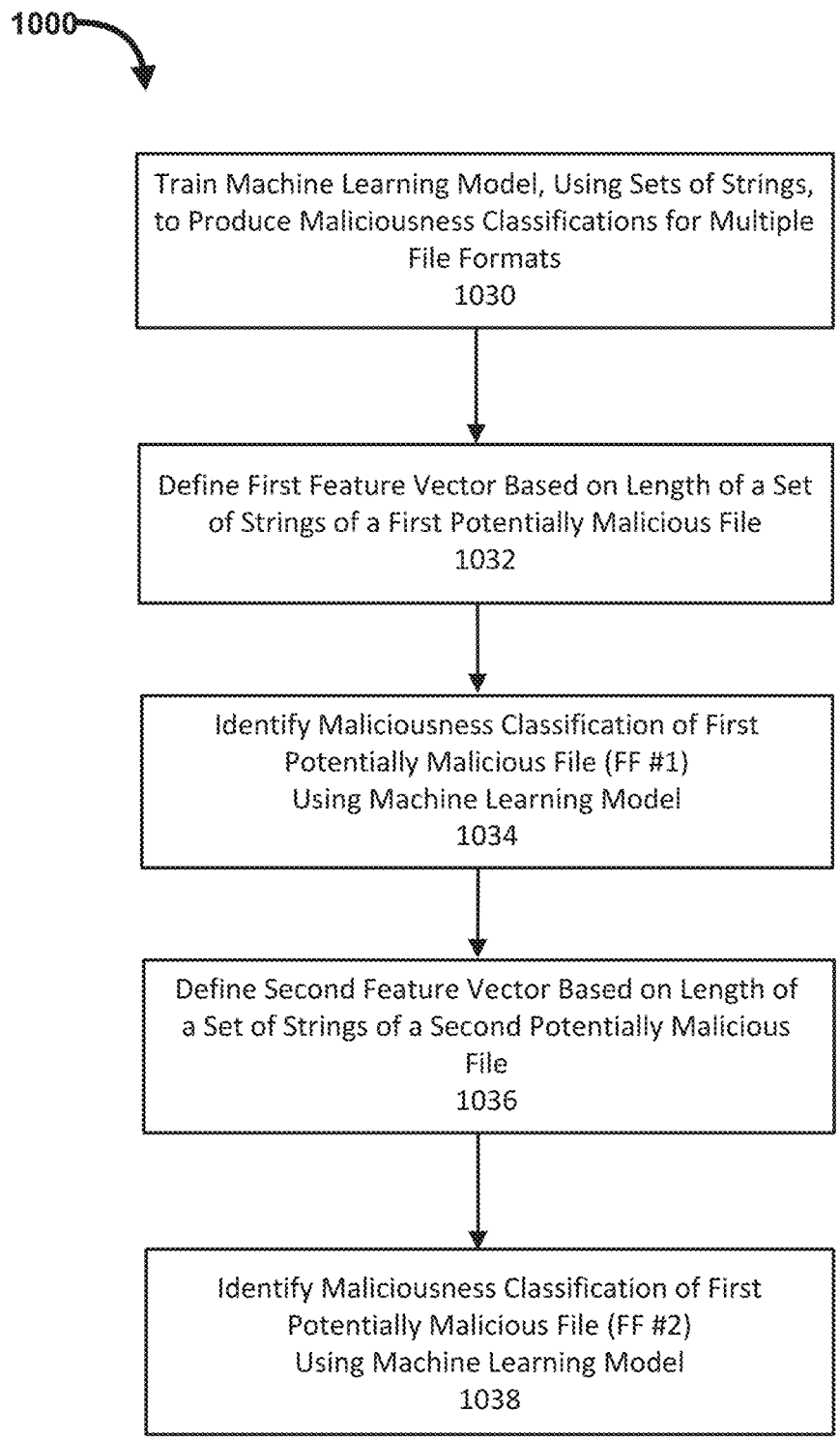
FIG. 10 is a flow chart showing a process for training a machine learning model for multiple file formats, using string length as an input, according to an embodiment.

FIG. 10 is a flow chart showing a process for training a machine learning model for multiple file formats, using string length as an input, according to an embodiment. As shown in FIG. 10, a method 1000 for detecting malicious files includes training a machine learning model (at 1030), using a length of each string from a first set of strings and a length of each string from a second set of strings, to produce a maliciousness classification for files having a first file format (FF #1) and for files having a second file format (FF #2) different from the first file format. The first set of strings can be from a file having the first file format and the second set of strings can be from a file having the second file format. The method also includes defining, at 1032, a first feature vector based on a length of a set of strings within a first potentially malicious file having the first file format (e.g., string length vs. string hash value, as shown and described with reference to FIG. 7B), and providing the first feature vector to the machine learning model to identify (at 1034) a maliciousness classification of the first potentially malicious file. Alternatively or in addition, the machine learning model can be trained using one or more other features, such as entropy, byte n-grams, byte values, byte standard deviations, etc. The method also includes defining, at 1036, a second feature vector based on a length of a set of strings within a second potentially malicious file having the second file format, and providing the second feature vector to the machine learning model to identify (at 1038) a maliciousness classification of the second potentially malicious file.

To evaluate the methods set forth herein, a dataset of over 5 million malicious/benign Microsoft® Office documents (i.e., a "first dataset") was collected from a first data source, and a dataset of benign Microsoft® Office documents was collected from a second data source (i.e., a "second dataset"). These datasets were used to provide estimates of thresholds for false positive rates on in-the-wild data. A dataset of approximately 500,000 malicious/benign ZIP archives (containing several million examples) was also collected and scraped, and a separate evaluation was performed on the scraped dataset. Predictive performance of several classifiers on each of the datasets was analyzed using a 70/30 train/test split on first seen time, evaluating feature and classifier types that have been applied successfully in commercial antimalware products and R&D contexts. Using deep neural networks and gradient boosted decision trees, receiver operating characteristic (ROC) curves with >0.99 area under the curve (AUC) were obtained on both Microsoft® Office document and ZIP archive datasets. Discussion of deployment viability in various antimalware contexts, and realistic evaluation methods for conducting evaluations with noisy test data are provided. Based on evaluations of novel real-world attacks using Microsoft® Office Documents infected with Petya, machine learning ("ML") methods are shown to work where signature-based engine implemented methods fail. Evaluations of classifiers and feature types for office document and archive malware are presented herein. Viability of a static machine learning based email attachment detection is also demonstrated.

Figure 3:
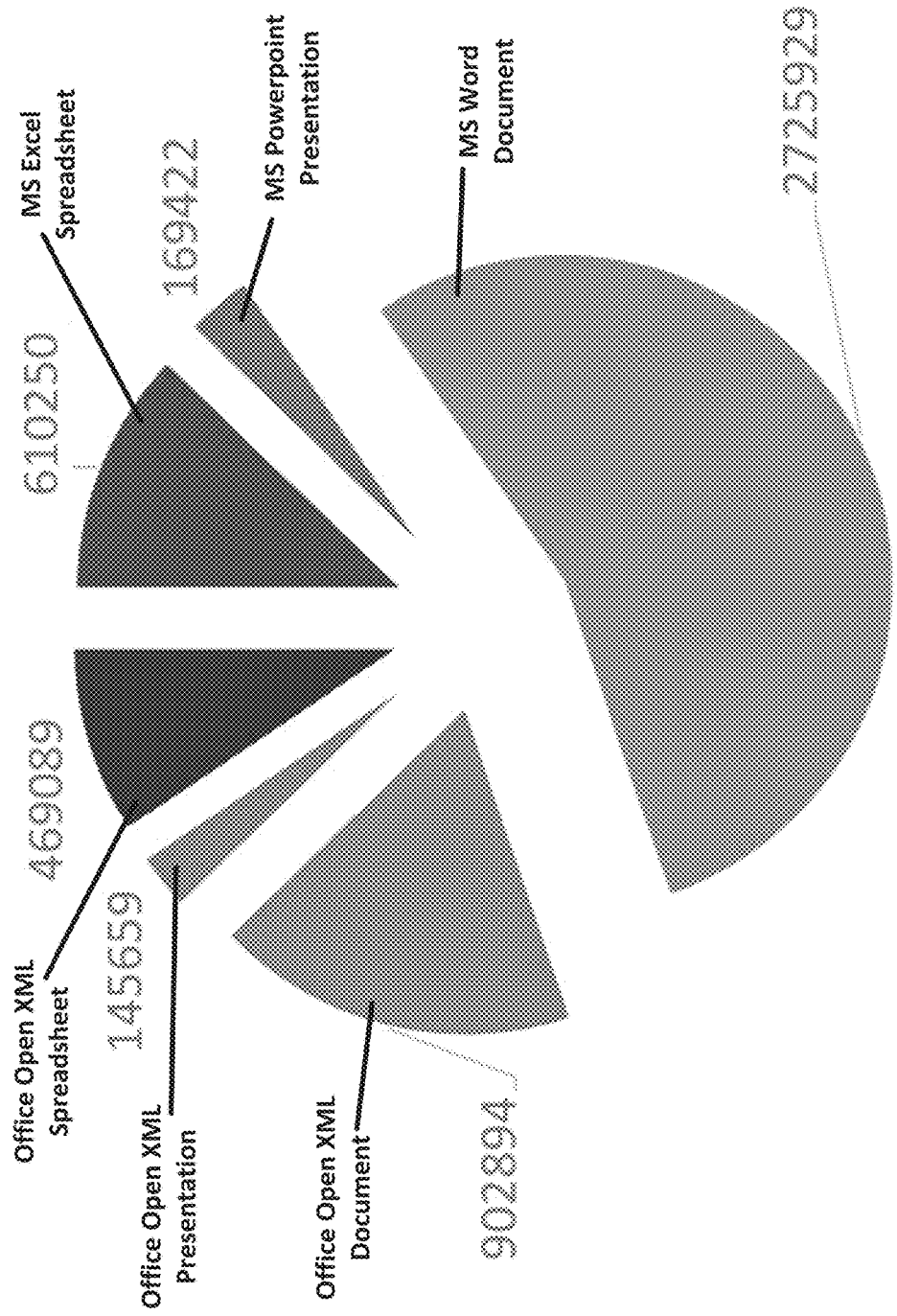
FIG. 3 is a pie chart showing a numerical breakdown of file types present in an example first dataset, according to an embodiment.

An initial dataset of 5,023,243 malicious and benign office documents was collected by scraping files and reports from a data source. An example of a data source is Virus Total, a free online virus, malware and url scanner service, which submits files to a variety of antimalware products and returns vendor responses. Malicious/benign labels were assigned on a 5+/1− basis, i.e., for documents for which one or fewer vendors labeled malicious, the aggregate label benign was ascribed, while for documents for which 5 or more vendors labeled malicious, the aggregate label malicious was ascribed. Initially, 6 million documents were collected, but those with between 2 and 4 (inclusive) vendor responses were omitted from the dataset. This 5+/1− criterion was used, in part, because vendor label information is given after some time lag between the first seen time of a sample and the last scan time of the sample, and it is preferable for the classifier to be able to make a good prediction that is somewhat unaffected by biases within the vendor community. Empirical analysis suggests that this labeling scheme works reasonably well for assigning aggregate malicious/benign scores. Note also that due to the fundamentally generalized nature of machine learning, the goal is not merely to emulate vendor aggregation, but also to learn predictive latent patterns that correctly make future predictions of malicious/benign when other vendors' signature-based methods fail. The breakdown of an example derived document dataset by file format type is shown in FIG. 3. As shown in FIG. 3, the majority of available data includes legacy (.doc) and new (.docx) word processing formats.

Since an objective was to obtain a predictive classifier for multiple file formats (e.g., OLE2 and XML), a 70/30 quantile split on the first seen timestamp was performed on the dataset, allocating the first 70th percentile as a training set and the last 30th percentile as a test set. Numerous experiments were performed using both DNN and XGBoost classifiers with byte entropy histograms, string length-hash histograms, and byte mean-standard deviation histograms as features. Features were extracted across whole documents, and it was found that length-hash features disproportionately performed the best of any one feature type when delimiting by non-printable characters as well as "<", ">", "/", "†", and " ". Byte entropy and mean-standard deviation histograms were uniformly spaced along each axis, initially to have a total of 1024 bins, then later downsized to 256 bins each after experiments indicated negligible gain from added feature dimension. String length-hash features were configured to have a total of 1024 dimensions; 64 per logarithmic scale of string length. Only strings between 5 and 128 characters were considered, with the remainder ignored. The bins of the feature vector were also logarithmically scaled, as it was observed that this resulted in a slight performance increase. In some instances, the contents of compressed Open XML format documents were unpacked and concatenated prior to extracting features. Surprisingly, this resulted in a performance decrease, which suggests that the classifiers described herein can learn predominantly from file metadata. Although the foregoing example describes a bin quantity of 1024 bins (downsized to 256 bins), in other implementations, larger or smaller bin quantities can be used.

Figure 4:
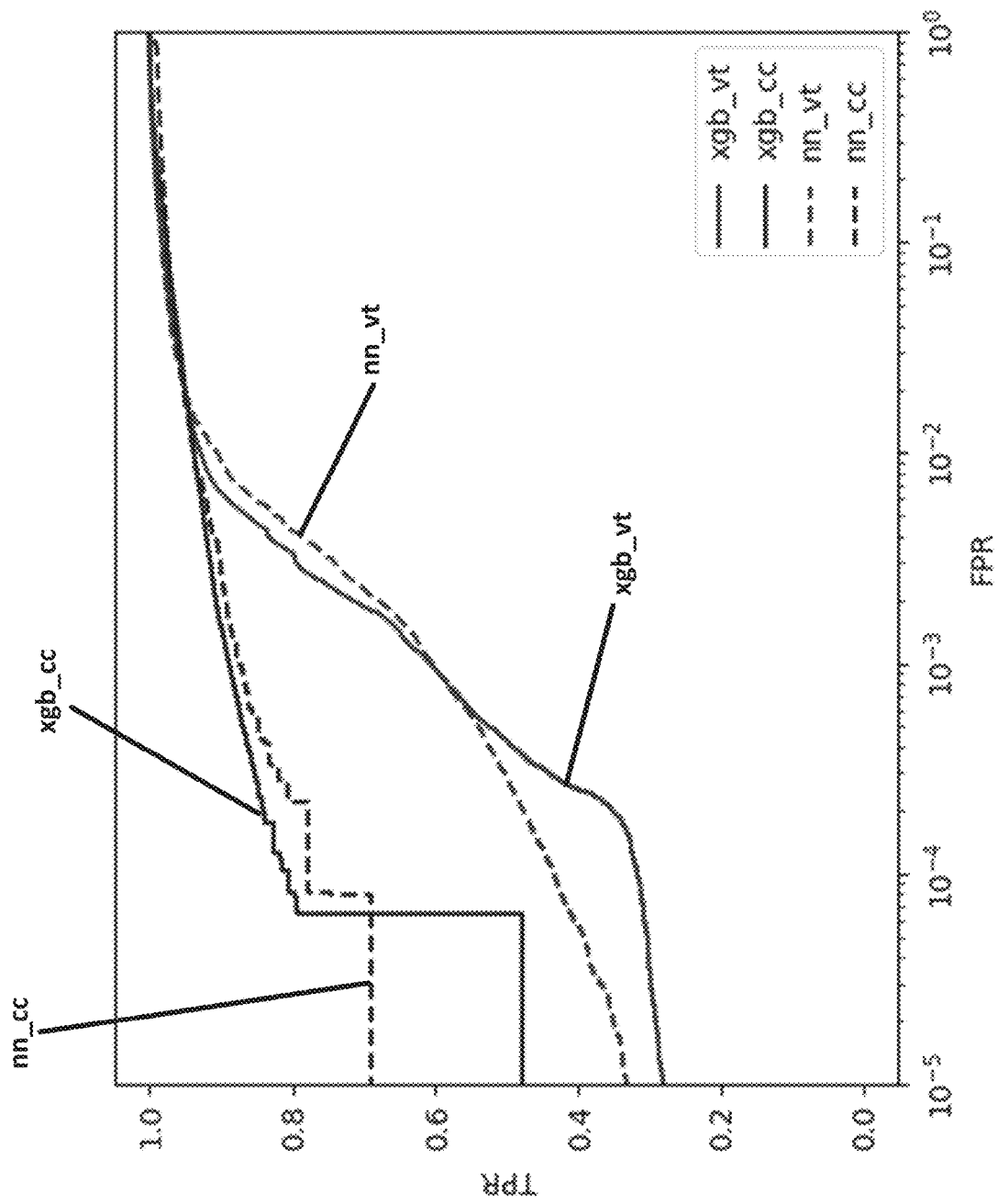
FIG. 4 is a plot of Receiver Operating Characteristics (ROC) curves for office document deep neural network (DNN) and eXtreme Gradient Boosting (XGB) classifiers for the example first dataset and an example second dataset, according to an implementation.

Using concatenations of the feature vectors—string length-hash, byte entropy, and byte mean-standard deviation histograms—for both DNN and XGBoost (XGB) Classifiers, it was possible to obtain an area under a receiver operating characteristics (ROC) curve of greater than 0.99, with the DNN (curves labelled "nn_cc" and "nn_vt") slightly outperforming XGBoost (curves labelled "xgb_cc" and "xgb_vt"). Curves including "vt" in their labels are associated with the first dataset, and curves including "cc" in their labels are associated with the second dataset. In FIG. 4, the vertical axis corresponds to the true positive rate (TPR) and the horizontal axis corresponds to the false positive rate (FPR). Using the same features to train a linear support vector machine under a tuned C value yielded less than 0.90 AUC, suggesting that expressive nonlinear concepts can indeed be derived from the input feature space representations, pointing to the utility of more expressive nonlinear classifiers. The plot of FIG. 4 suggests that the first dataset may be rife with false positives that vendors miss since files submitted are disproportionately malicious/suspicious, and that obtaining true positive rates (TPRs) on the first dataset at false positive rates (FPRs)/thresholds derived from the second dataset yields a more realistic evaluation.

Additionally, it was found that the DNN's performance did not noticeably improve when using a concatenation of all features, as opposed to just string length-hash features, however XGBoost's performance improved substantially. This suggests that the DNN architecture described above is favorable, from a deployment perspective, as feature extraction accounts for the majority of processing time at inference—particularly when classifying large documents.

As an exploratory analysis, outputs from intermediate layers of the trained network were used on the train and test sets as feature vectors for XGBoost, since the learning processes of the two classifiers are fundamentally different, however this resulted in a performance degradation. Training models with additional hidden layers were also attempted, which yielded slightly decreased performance, as well as separate malicious/benign outputs—one per file-type—along with a global malicious/benign score under a Moon-like topology (see Ethan M Rudd, Manuel Gunther, and Terrance E Boult. Moon: A mixed objective optimization network for the recognition of facial attributes. In European Conference on Computer Vision, pages 19-35. Springer, 2016, incorporated herein by reference in its entirety). While the Moon-like network yielded slightly better performance in low FPR regions of the ROC, performance deteriorated in higher FPR regions, yielding no net gains for the added complexity.

During evaluation, a forensic investigation of the dataset was performed, in which VBA macros were dumped (i.e., read) for 100 "benign" files from the first data source that the DNN labeled malicious with high confidence. In the majority of cases, signs of malicious payloads and code obfuscation were found, suggesting that a significant number of "false positives" from the first dataset might actually be false negative novel attacks that vendors missed.

This forensic analysis finding suggests that using vendor labels from the first dataset as a test criterion may be implicitly biasing the success criteria to currently existing classifiers and unfairly penalizing those capable of generalizing to novel malicious behavior seen in novel attacks. Many of the vendor scores in the first data source come from signature-based—not machine learned—anti-malware engines. As such, it is surmised that using the first data source gives an unfairly pessimistic estimate of false positive rate. This may be exacerbated by the fact that files submitted to the first data source are often far more likely to be malicious (or at least suspicious) than most files in the wild.

An additional corpus of approximately 1 million likely benign documents were collected, by scraping from known benign URLs from a web archiving service (e.g., Common Crawl) and submitted these to the first data source for labeling. Of the documents, 15 were labeled as malicious. Discarding these and taking the rest as benign, this dataset was used to re-evaluate false positive rate, and using corresponding thresholds, to estimate the true positive rate on the first dataset. Via this procedure, noticeable gains were achieved (cf. the lines labelled "nn_cc" and "xgb_cc" in FIG. 4). Note that this may even be an under-estimate of true performance because gains in the network from detecting mislabeled false negatives in the first dataset are not recognized (but at least they are not penalized).

Figure 5:
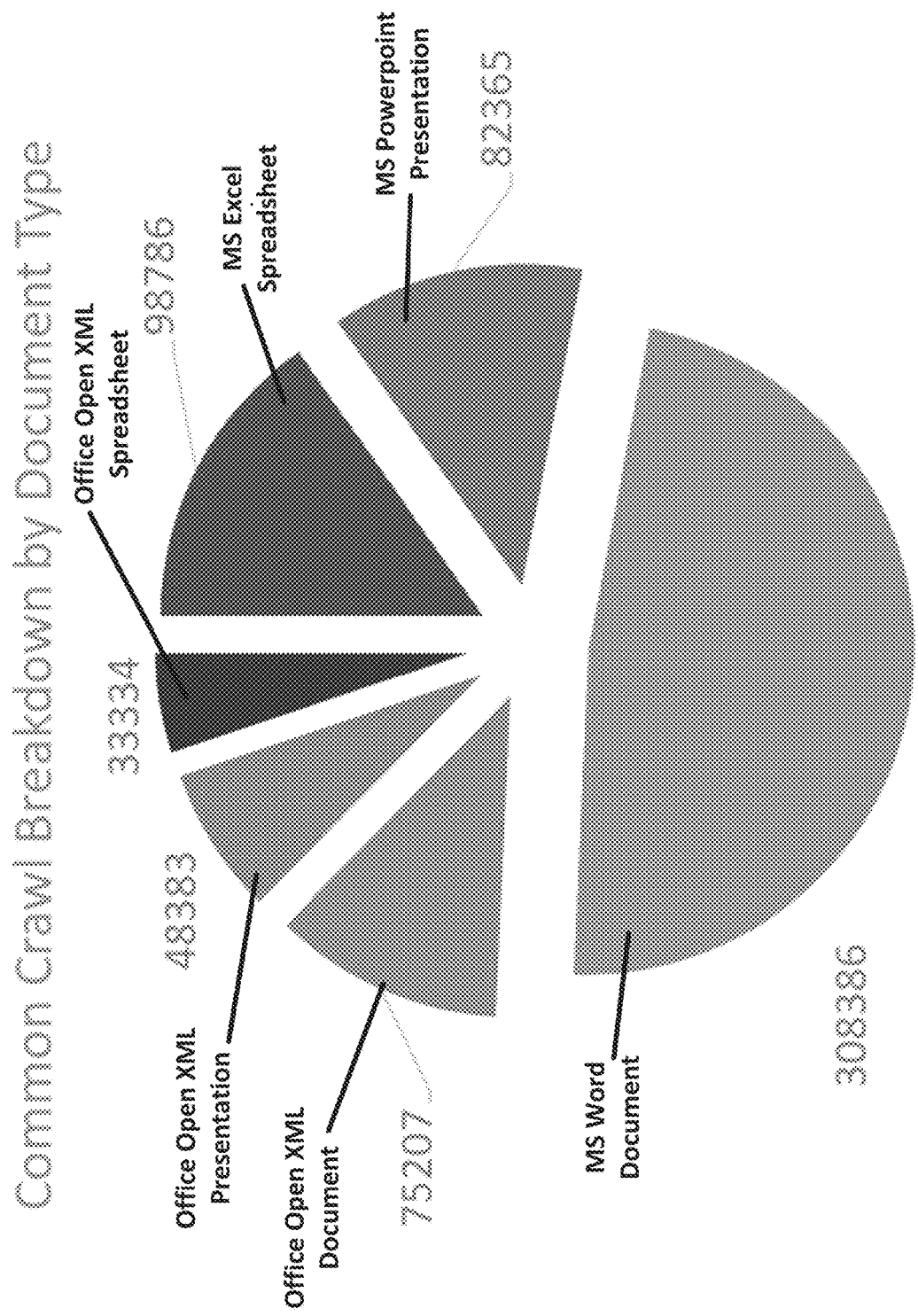
FIG. 5 is a pie chart showing a numerical breakdown of file types present in the second example dataset, according to an embodiment.

FIG. 5 shows a numeric breakdown of the second dataset documents by file type. As with the first dataset, the majority of available data includes legacy (.doc) and new (.docx) word processing formats, suggesting coarse alignment in terms of dataset balance/bias. This can be an important consideration when using the dataset to assess realistic thresholds for false positive rate.

As an additional qualitative analysis of the system's capability to generalize malicious concepts, an analysis was conducted on office documents infected by the recent Petya ransomware, a malware notorious for employing novel exploits. Without commenting on specific vendors' detection capabilities, Petya was able to propagate undetected and cause a global cyber security crisis despite the presence of numerous antimalware engines. At a threshold yielding an FPR of 1e-3 assessed on the second dataset, to the system detected 5 out of 9 malicious Petya samples, which provides further evidence that the DNN may have learned generalized malicious concepts within its latent representations beyond any capacity of signature-driven systems. Note, also, that data upon which the network was trained was collected prior to the Petya outbreak.

Along a similar vein to the office document dataset, a dataset of approximately 500,000 ZIP archives was collected by scraping the first data source. It was found that ZIP archives exhibited much larger variation in size than office documents. A similar 70/30 train/test split was performed on timestamps as was done for office documents, grouping samples with first seen timestamps in the first 70th percentile into the training set and samples with first seen timestamps in the last 30th percentile into the test set.

While for such a small dataset, content and metadata could be extracted and concatenated, from a practical perspective, this becomes problematic when dealing with large, potentially nested ZIP archives. Moreover, the above findings suggest that useful features for classification are typically contained within metadata for a very structured subset of ZIP archives (e.g., Open XML format office documents). Extracting similar string length-hash features over archives and fitting a DNN, yielded an ROC with an AUC of less than 0.9, which may not be useful for commercial antimalware applications.

Without wishing to be bound by theory, it is hypothesized that this poor performance may be due to a low signal-to-noise ratio in the feature space, and thus chose to extract a set of features over more relevant sections of ZIP archives. Using knowledge of ZIP archive structure (e.g., FIG. 2), an easy-to-extract set of features was generated: First, by matching appropriate numbers, raw bytes were dumped (i.e., read) from each archive's central directory structure. The numbers that are matched can include sets of unique byte sequences that start a file and indicate a format of the file (or portions thereof). For example, Microsoft® Office Word files typically start with the bytes "D0 CF 11 E0." The last 1 MB of the archive's raw bytes was then dumped (i.e., read), or the entire archive for archives less than 1 MB in size. Over the central directory structures, 1024 dimensional feature vectors were extracted: string length-hash histograms, byte entropy features, and hashed 3, 4, 5, and 6 grams. Over the last 1 MB, 1024 MB byte entropy features and string length-hash histograms were extracted. N-grams were omitted due to lengthy extraction times. For string length-hash features, a similar parameterization as described above was used, except that length 2 was used as a lower-bound cutoff for considering a given string.

Figure 6:
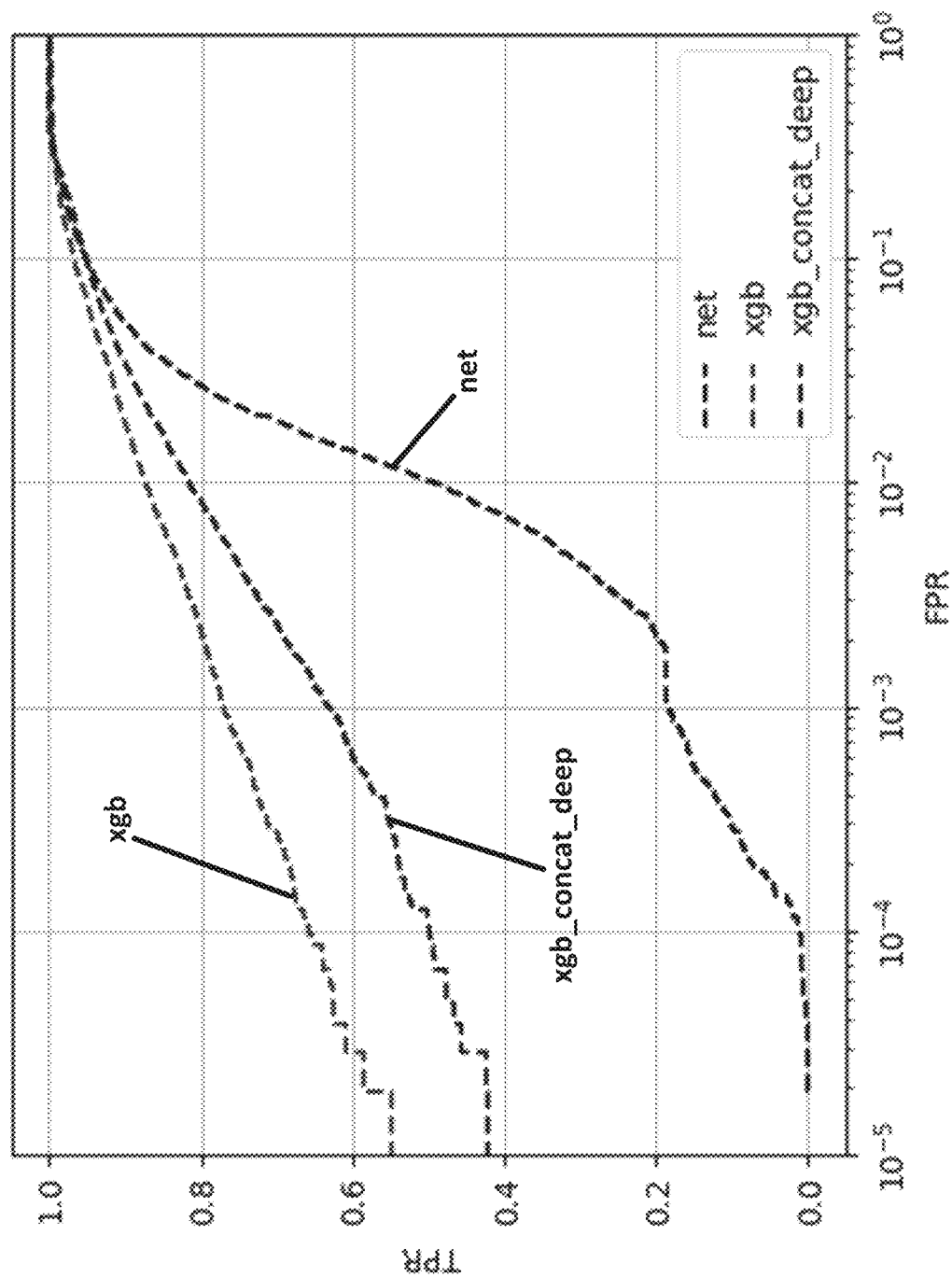
FIG. 6 is a plot of ROC curves for a ZIP archive dataset using DNN and XGB classifiers, according to an implementation.

As classifiers, the same XGBoost and DNN classifiers were used as described above. Results are shown in FIG. 6. FIG. 6 shows ROC curves for the best DNN (top curve) and XGBoost (bottom curve) classifiers using the ZIP archive dataset. The middle curve was obtained by concatenating deep features obtained from the network to the original feature vectors and performing training/testing using XGBoost classifier over these. The DNN's performance differed from that of the XGB across multiple single feature types. For example, using a concatenated 5120-dimensional feature vector, the DNN underperformed XGB, offering an ROC with an AUC of 0.98. Concatenating the features using XGBoost yielded an AUC of greater than 0.99, with differences particularly pronounced in low-FPR regions. Depending on the implementation, the XGBoost may be preferred over the DNN, the DNN may be preferred over the XGBoost, or both may be used.

Via the same methodology in Sec. VI, the network was used to extract deep features, concatenate them with the five feature types, and fit an XGBoost classifier. This resulted in noticeably diminished performance for the XGBoost classifier, however this problem can be ameliorated by using a larger archive dataset.

Systems and methods set forth herein establish that machine learning is a viable approach for certain malicious email attachment scanner applications, particularly those tuned for a high false positive rate, where false positives are passed to a secondary scanner for enhanced detection—e.g., a dynamic detection engine in a sandbox. Using fixed-size histogram features as input, both DNN and XGB classifiers offered comparable performance for office document data, but depending on the implementation, XGB may be preferred over DNNs (e.g., on generic ZIP archive data), or vice-versa. In some embodiments, a larger amount of data may be needed for DNNs, as compared with XGB. Without wishing to be bound by theory, DNNs may, in some implementations, be viewed as learning to "memorize" interesting patterns without deriving feature spaces that offer smooth statistical support. Additionally, larger datasets can be collected and additional attachment types (e.g., RAR, 7ZIP, GZIP, CAB, PDF, etc.) can be used.

Deep learning can be used for malicious email attachment detection as well as for the detection of other antimalware applications (including those that the community is still researching), including learning embeddings and sequence models over features from different sections of a file, leveraging large quantities of unlabeled data, e.g., via ladder networks, and discovery of generic byte-level embeddings.

In some embodiments, given a centralized mail server, multiple classifiers can be user, for detection across different attachment formats. Alternatively, in other embodiments, a single shared representation can be used to handle multiple file types and/or formats, without introducing the problem of catastrophic forgetting.

Figure 11:
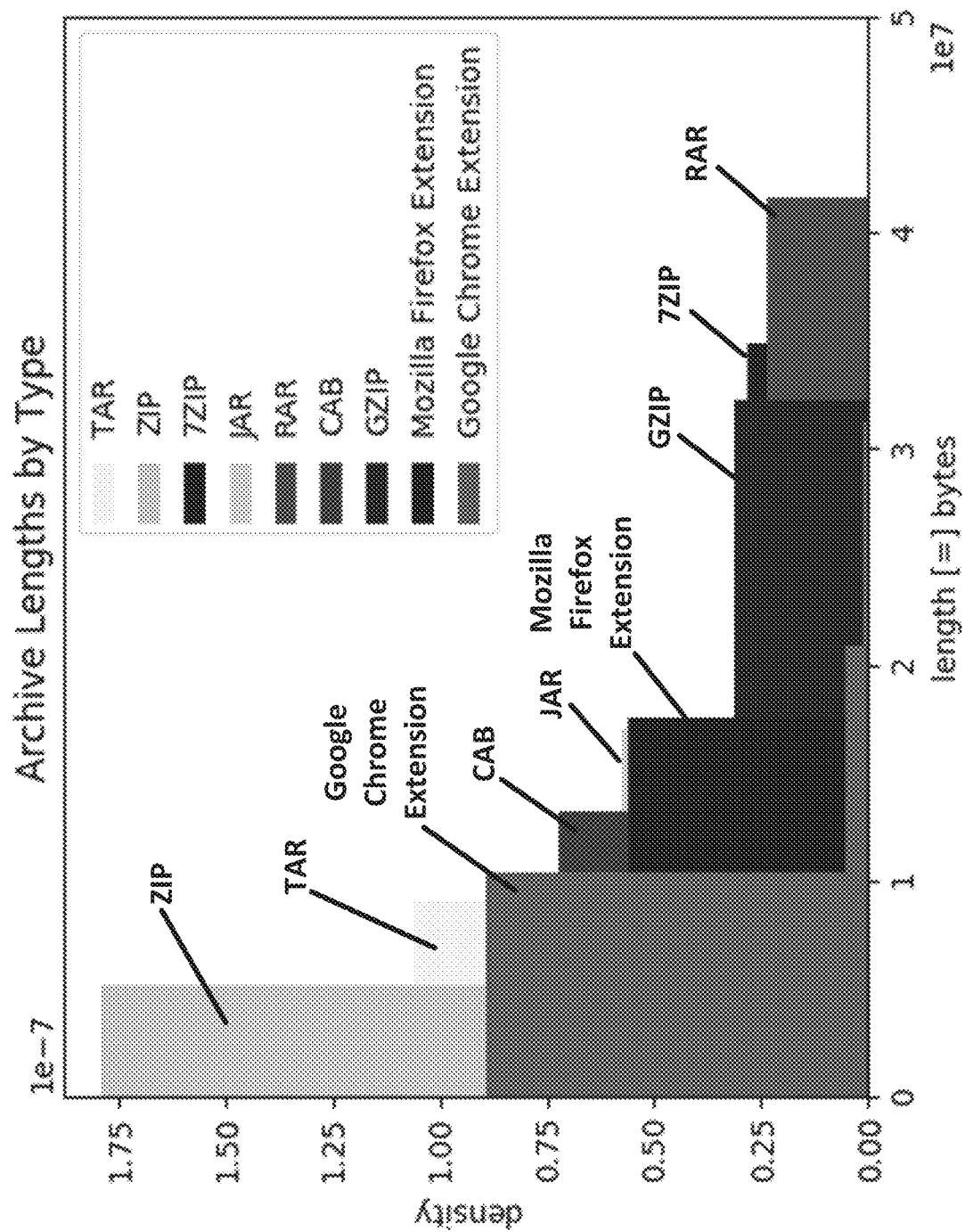
FIG. 11 is a plot of density versus length for multiple different archive types, according to an implementation.

FIG. 11 is a plot showing relative densities versus length for the archive types TAR, ZIP, 7ZIP, JAR, RAR, CAB, GZIP, Mozilla Firefox Extension and Google Chrome Extension, according to an implementation. FIG. 11 illustrates a rough distribution of sizes by different archive types. The time to download and/or process large archives can become cost-prohibitive due to the size of the archive. If, however, the central directory structure is used without the rest of the file, or if the end of the file (e.g., last 1 MB of the file) is used instead of the entire file, the entire file may not need to be downloaded and processed.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The phrase "based on" does not mean "based only on," unless expressly specified otherwise. In other words, the phrase "based on" describes both "based only on" and "based at least on."

The term "processor" should be interpreted to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a set of microprocessors, one or more microprocessors in conjunction with a DSP core or any other such configuration.

The term "memory" should be interpreted to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by computer code/software (executed on hardware), hardware, or a combination thereof. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided herein, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including,"

"carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. An apparatus for detection of malicious documents using machine learning, comprising:
a memory; and
a processor device communicatively coupled to the memory, the processor device configured to receive a first potentially malicious file and a second potentially malicious file, the first potentially malicious file having a first file format, the second potentially malicious file having a second file format different than the first file format,
the processor device configured to extract a first plurality of strings from the first potentially malicious file, the processor device configured to extract a second plurality of strings from the second potentially malicious file, wherein the first plurality of strings being from a file having the first file format and the second plurality of strings being from a file having the second file format,
the processor device configured to generate a first histogram based on a length of each string from the first plurality of strings and a second histogram based on a length of each string from the second plurality of strings,
the processor device configured to define a first feature vector based on the first histogram,
the processor device configured to define a second feature vector based on the second histogram,
the processor device configured to provide the first feature vector as an input to a machine learning model to produce a maliciousness classification of the first potentially malicious file corresponding to a first type of malware,
the processor device configured to provide the second feature vector as an input to the machine learning model to produce a maliciousness classification of the second potentially malicious file corresponding to a second type of malware.

2. The apparatus of claim 1, wherein the first file format is an Object Linking and Embedding 2.0 (OLE2) format and the second file format is an Extensible Markup Language (XML) format.

3. The apparatus of claim 1, wherein the machine learning model is at least one of a deep neural network or a boosted classifier ensemble.

4. The apparatus of claim 1, wherein the maliciousness classification of the first potentially malicious file indicates whether the first potentially malicious file is malicious or benign.

5. The apparatus of claim 1, wherein the maliciousness classification of the first potentially malicious file classifies the first potentially malicious file as a type of malware.

6. The apparatus of claim 1, wherein the first histogram includes an indication of how often a string from the first plurality of strings has a combination of a string length range and a string hash value range.

7. The apparatus of claim 1, wherein each string from the first plurality of strings is delimited by at least one of a space, a "<", a ">", a "/", or a "\".

8. The apparatus of claim 1, wherein the first histogram includes a representation of the length of each string from the first plurality of strings on a logarithmic scale.

9. The apparatus of claim 1, wherein the processor device is configured to perform a remedial action based on the maliciousness classification of the first potentially malicious file indicating that the first potentially malicious file is malicious,
the remedial action including at least one of quarantining the first potentially malicious file, notifying a user that the first potentially malicious file is malicious, displaying an indication that the first potentially malicious file is malicious, or removing the first potentially malicious file.

10. The apparatus of claim 1, wherein the first histogram and the second histogram are of a same length.

11. A non-transitory processor-readable medium storing code representing instructions to be executed by a processor device for detection of malicious documents using machine learning, the code to cause the processor device to:
receive potentially malicious files having archive formats, wherein the potentially malicious files include a first potentially malicious file having a fist file format and a second potentially malicious file having a second file format different than the first file format;
identify a central directory structure of the first potentially malicious file and the second potentially malicious file;
extract, based on identifying the central directory structure, a plurality of strings from the central directory structure, wherein the plurality of strings includes a first plurality of strings from the first potentially malicious file having the first file format, and a second plurality of strings from the second potentially malicious file having the second file format;
generate histograms based on a length of each string from the plurality of strings, wherein the histograms include a first histogram based on a length of each string from the first plurality of strings and a second histogram based on a length of each string from the second plurality of strings;
define a respective feature vector based on each of the respective first histogram and second histogram; and
provide the respective feature vector as an input to a machine learning model to produce a maliciousness classification of the potentially malicious files corresponding to a respective type of malware.

12. The non-transitory processor-readable medium of claim 11, wherein the first file format is a ZIP format or a zip-derived format.

13. The non-transitory processor-readable medium of claim 11, wherein the respective feature vector based on the first histogram includes an indication of how often a string from the first plurality of strings has a combination of a string length range and a string hash value range.

14. The non-transitory processor-readable medium of claim 11, wherein the respective feature vector based on the first histogram is not based on strings of the first potentially malicious file that are outside the central directory structure.

15. The non-transitory processor-readable medium of claim 11, wherein the code to cause the processor device to identify includes code to cause the processor device to identify the central directory structure of the first potentially malicious file based on a byte entropy of the central directory structure of the first potentially malicious file.

16. The non-transitory processor-readable medium of claim 11, wherein the machine learning model is at least one of a deep neural network or a boosted classifier ensemble.

17. The non-transitory processor-readable medium of claim 11, wherein the code to cause the processor device to generate the histograms further includes code to cause the processor device to generate the histograms to provide an indication of how often a string from the plurality of strings has a combination of an informational entropy range and at least one of a byte value range or a byte standard deviation range.

18. A method for detection of malicious documents using machine learning, comprising
training, using a length of each string from a first plurality of strings and a length of each string from a second plurality of strings, a machine learning model to produce a maliciousness classification corresponding to a respective type of malware for files having a first file format and files having a second file format different from the first file format, the first plurality of strings being from a file having the first file format and the second plurality of strings being from a file having the second file format;
generating a first histogram based on a length of a plurality of strings within a first potentially malicious file, the first potentially malicious file having the first file format;
defining a first feature vector based on the first histogram;
identifying a maliciousness classification of the first potentially malicious file corresponding to a first type of malware by providing the first feature vector to the machine learning model;
generating a second histogram based on a length of a plurality of strings within a second potentially malicious file, the second potentially malicious file having the second file format;
defining a second feature vector based on the second histogram; and
identifying a maliciousness classification of the second potentially malicious file corresponding to a second type of malware by providing the second feature vector to the machine learning model.

19. The method of claim 18, wherein the first file format is an Object Linking and Embedding 2.0 (OLE2) format and the second file format is an Extensible Markup Language (XML) format.

20. The method of claim 18, wherein the first feature vector includes an indication of how often a string from the plurality of strings within the first potentially malicious file has a combination of a string length range and a string hash value range.

21. The method of claim 18, wherein each string from the plurality of strings within the first potentially malicious file is delimited by at least one of a space, a "<", a ">", a "/", or a "\".

22. The method of claim 18, wherein the first feature vector is logarithmically scaled.

23. The method of claim 18, wherein the first feature vector has a predefined vector length, and the second feature vector has the same predefined vector length.

24. The method of claim 18, wherein the first feature vector includes an indication of how often a string from the plurality of strings within the first potentially malicious file has a combination of an informational entropy range and at least one of a byte value range or a byte standard deviation range.

* * * * *

UNITED STATES PATENT AND TRADEMARK OFFICE
CERTIFICATE OF CORRECTION

PATENT NO. : 11,003,774 B2
APPLICATION NO. : 16/257749
DATED : May 11, 2021
INVENTOR(S) : Joshua Daniel Saxe et al.

It is certified that error appears in the above-identified patent and that said Letters Patent is hereby corrected as shown below:

In the Specification

Column 5, Line 48 delete "(.z), compress (.Z), 7z (0.7z), 7zX (.s7z), ACE (.ace), AFA" and insert
-- (.z), compress (.Z), 7z (.7z), 7zX (.s7z), ACE (.ace), AFA --

Column 5, Line 55 delete "(.lzx), PAK (.pak), Partlmage (.partimg), PAQ (.paq6, .paq7," and insert
-- (.lzx), PAK (.pak), PartImage (.partimg), PAQ (.paq6, .paq7, --

Column 5, Line 56 delete ".paq8), PeaZip (.pea), PIM (.pim), Pack1t (.pit), Quadruple D" and insert
-- .paq8), PeaZip (.pea), PIM (.pim), PackIt (.pit), Quadruple D --

Column 5, Line 59 delete "Self Extracting Archive (.sfx), NuFX (.shk), Stufflt (.sit)," and insert
-- Self Extracting Archive (.sfx), NuFX (.shk), StuffIt (.sit), --

Column 18, Line 58 delete "files typically start with the bytes "DO CF 11 E0." The last" and insert
-- files typically start with the bytes "D0 CF 11 E0." The last --

In the Claims

Column 24, Line 27 (Claim 11), delete "potentially malicious file having a fist file format and a" and
insert -- potentially malicious file having a first file format and a --

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*